(12) United States Patent
Poole et al.

(10) Patent No.: US 12,201,949 B2
(45) Date of Patent: Jan. 21, 2025

(54) AUTONOMOUS LOCALIZED PERMEABILITY MATERIAL SYSTEMS AND METHODS FOR USING AND MAKING SAME

(71) Applicant: TELEDYNE FLIR DEFENSE, INC., North Billerica, MA (US)

(72) Inventors: Jennifer L. Poole, Delmont, PA (US); Jeremy P. Walker, Oakmont, PA (US); Scott Donahue, Allison Park, PA (US)

(73) Assignee: TELEDYNE FLIR DEFENSE, INC., North Billerica, MA (US)

( * ) Notice: Subject to any disclaimer, the term of this patent is extended or adjusted under 35 U.S.C. 154(b) by 1027 days.

(21) Appl. No.: 16/465,868

(22) PCT Filed: Jan. 31, 2018

(86) PCT No.: PCT/US2018/016153
§ 371 (c)(1),
(2) Date: May 31, 2019

(87) PCT Pub. No.: WO2018/144547
PCT Pub. Date: Aug. 9, 2018

(65) Prior Publication Data
US 2019/0308141 A1 Oct. 10, 2019

Related U.S. Application Data

(60) Provisional application No. 62/452,490, filed on Jan. 31, 2017.

(51) Int. Cl.
*B01D 69/14* (2006.01)
*A62D 5/00* (2006.01)
(Continued)

(52) U.S. Cl.
CPC ............ *B01D 69/145* (2013.01); *A62D 5/00* (2013.01); *B01D 67/0088* (2013.01);
(Continued)

(58) Field of Classification Search
CPC .......... B01D 2255/804; B01D 2257/55; B01D 2325/02; B01D 2325/10; B01D 2325/12;
(Continued)

(56) References Cited

U.S. PATENT DOCUMENTS

2005/0249917 A1 11/2005 Trentacosta et al.
2010/0273197 A1 10/2010 Walker et al.

FOREIGN PATENT DOCUMENTS

GB 2453200 A 4/2009

OTHER PUBLICATIONS

Chu et al.; Control of pore size and permeability of a glucose-responsive gating membrane for insulin delivery; Feb. 13, 2004; p. 1-3, 9 (Year: 2004).*

(Continued)

*Primary Examiner* — Terry K Cecil
(74) *Attorney, Agent, or Firm* — K&L Gates LLP

(57) ABSTRACT

Autonomous localized permeability material systems are provided that can include: a dynamically permeable porous material; and immobilized reagents operatively associated with the porous material in sufficient proximity to trigger a localized change in material pore size upon reagent reaction. Methods for preparing these materials are also provided as well as methods for autonomously modifying localized permeability of material.

13 Claims, 23 Drawing Sheets

(51) Int. Cl.
  *B01D 67/00* (2006.01)
  *B01D 69/02* (2006.01)
  *B01D 71/28* (2006.01)
  *B01D 71/80* (2006.01)

(52) U.S. Cl.
  CPC ......... *B01D 67/0093* (2013.01); *B01D 69/02* (2013.01); *B01D 69/144* (2013.01); *B01D 69/147* (2013.01); *B01D 71/283* (2022.08); *B01D 71/80* (2013.01); *B01D 2255/804* (2013.01); *B01D 2257/55* (2013.01); *B01D 2325/10* (2013.01); *B01D 2325/12* (2013.01)

(58) Field of Classification Search
  CPC ............ B01D 67/0088; B01D 67/0093; B01D 69/02; B01D 69/144; B01D 69/145; B01D 69/147; B01D 71/26; B01D 71/28; B01D 71/40; B01D 71/80; A62D 5/00
  See application file for complete search history.

(56) References Cited

OTHER PUBLICATIONS

Omnexus; Young Modulus; Feb. 25, 2016; p. 1/3 (Year: 2016).*
Wandera et al., Stimuli-responsive membranes, Apr. 9, 2010, p. 1-20, 27 (Year: 2010).*
Poole et al. "Biocatalytic Stimuli-Responsive Asymmetric Triblock Terpolymer Membranes for Localized Permeability Gating", Macromolecular Rapid Communications, 2017, WILEY-VCH Verlag GmbH & Co. KGaA, Weinheim, 1700364, 6 pages.
Phillip et al., "Tuning Structure and Properties of Graded Triblock Terpolymer-Based Mesoporous and Hybrid Films", Nano Letters, 2011, 11, ACS Publications, pp. 2892-2900.
Pendergast et al., "Understanding the Structure and Performance of Self-Assembled Triblock Terpolymer Membranes", Journal of Membrane Science, 444, 2013, Elsevier B.V., pp. 461-468.
Tokarev et al., Stimuli-Responsive Hydrogel Membranes Coupled with Biocatalytic Processes, ACS Applied Materials & Interfaces, 2009, vol. 1, No. 3, pp. 532-536.

* cited by examiner a)
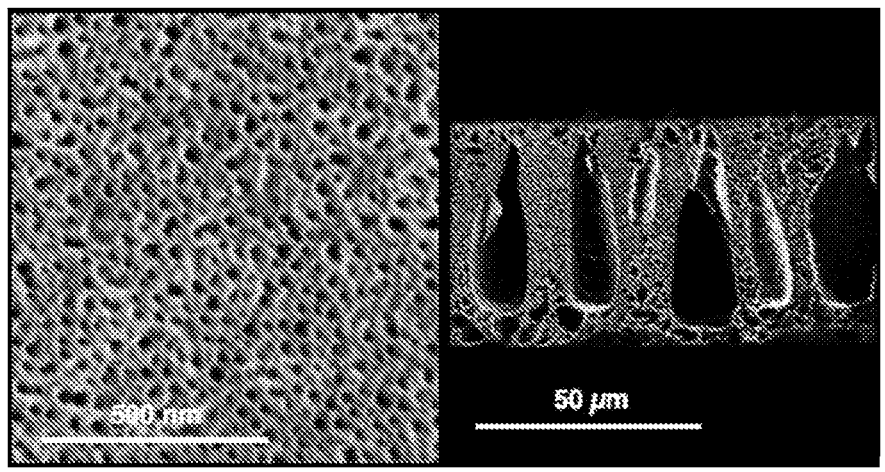
b)
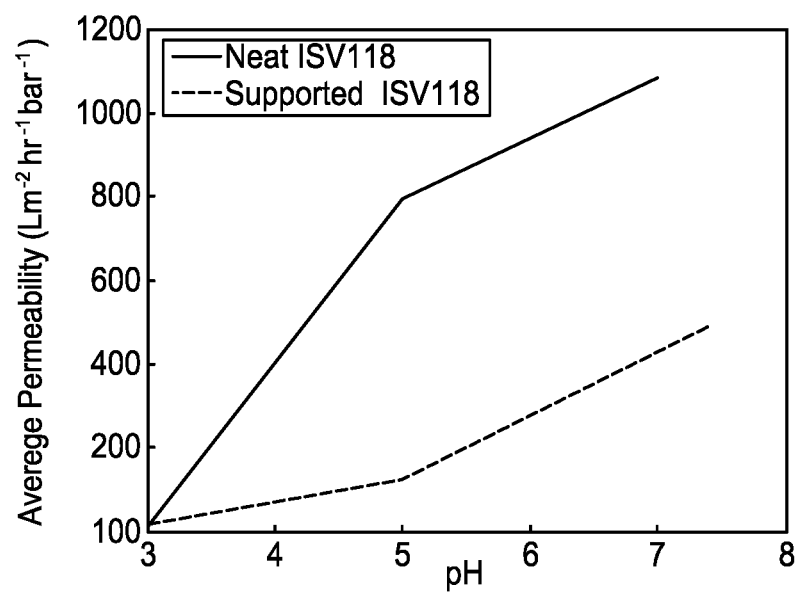
FIG. 11

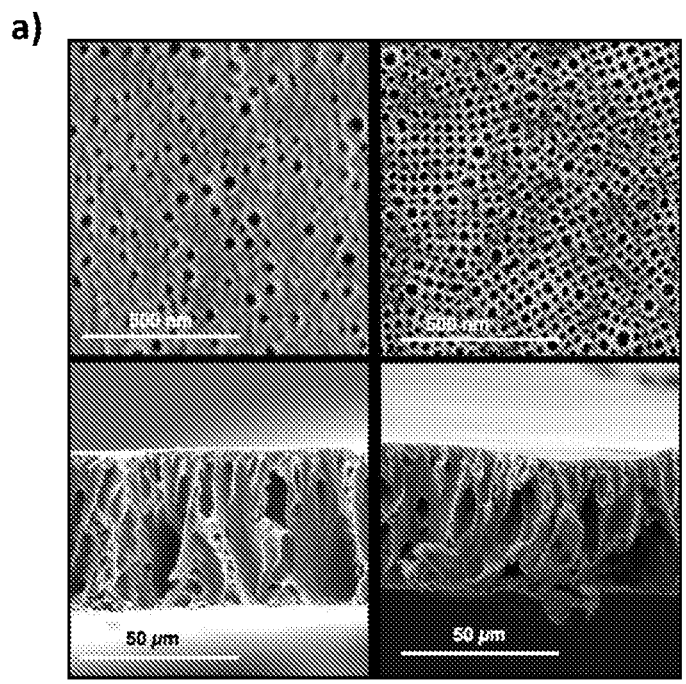
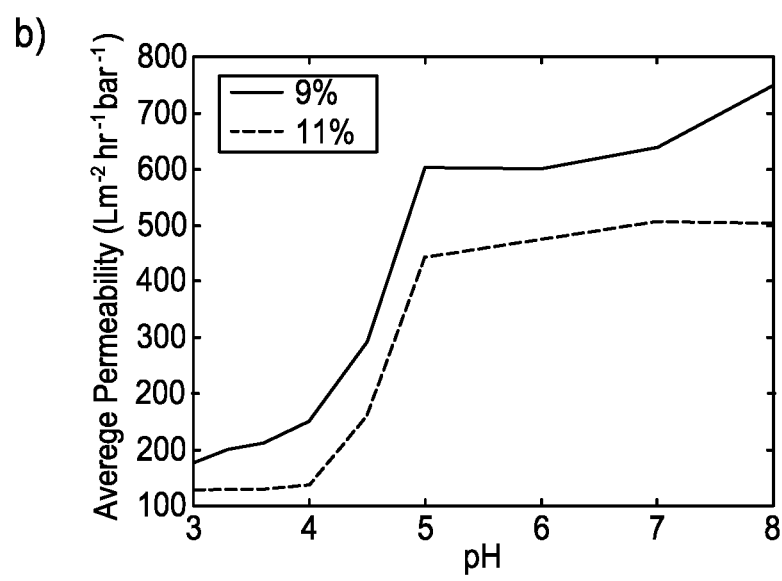
FIG. 12

FIG. 17

AUTONOMOUS LOCALIZED PERMEABILITY MATERIAL SYSTEMS AND METHODS FOR USING AND MAKING SAME

CLAIM FOR PRIORITY

This application claims priority to U.S. Provisional Patent Application Ser. No. 62/452,490 filed Jan. 31, 2017, entitled "Autonomous Localized Permeability Material Systems and Methods for Using and Making Same", the entirety of which is incorporated by reference herein.

GOVERNMENT INTEREST

This invention was made with Government support under Contract No. HDTRAI-13-C-0003 awarded by the Defense Threat Reduction Agency (DTRA). The Government has certain rights in the invention.

TECHNICAL FIELD

The present disclosure relates generally to porous materials and autonomous control of the permeability of these materials.

BACKGROUND

Porous materials have numerous uses crossing over from the chemical and/or biologically protective to the recreational and even industrial uses. As an example, chemical and biological protective clothing utilizes layering technology, wherein static barrier materials are stacked to mitigate contaminant breakthrough. In recent years these materials have been enhanced, but these enhancements do not provide the speed, selectivity, or molecular capacity to address complex threats as they arise in dynamic environments. In addition, the complexity of production and limited lifetime of these older materials may result in unsustainable financial costs that limit the benefits of protective technologies to small numbers of personnel. An additional challenge, however, is that these enhancements do not address the significant physical burden to the user due to the poor water vapor transport, heat management, and sheer bulk of the material. As a result of these shortcomings, users typically can only operate in full protective state for less than an hour at a time.

The present disclosure provides autonomous localized permeability material systems that can provide superior performance to that of the existing material systems.

SUMMARY OF THE DISCLOSURE

Autonomous localized permeability material systems are provided that can include: a dynamically permeable porous material; and immobilized reagents operatively associated with the porous material in sufficient proximity to trigger a localized change in material pore size upon reagent reaction.

Autonomous localized permeability material system preparation methods are provided that can include operatively associating immobilized reagents with a dynamically permeable porous material.

Methods for autonomously modifying localized permeability of material are also provided. These methods can include: providing a dynamically permeable porous material operatively associated with immobilized reagents; reacting the reagents with a reactant to form a product; and exposing the product to the dynamically permeable porous material, with the exposing of the product modulating the permeability of the material.

DRAWINGS

Embodiments of the disclosure are described below with reference to the following accompanying drawings.

Figure 10A:
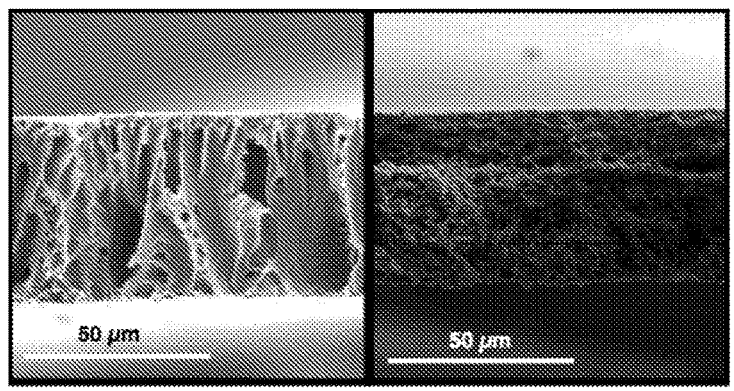
Figure 10B:
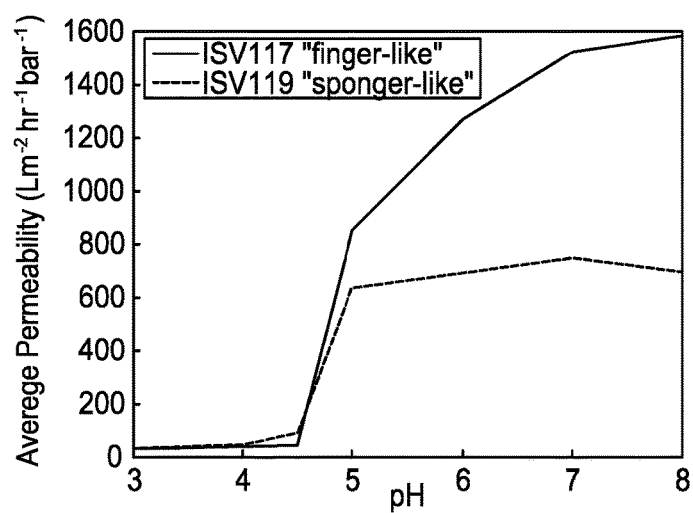

FIGS. 10A and 10B provide SEM images and material characterization data of material systems according to embodiments of the disclosure.

FIG. 11 depicts SEM images and permeability data of material systems according to embodiments of the disclosure.

FIG. 12 depicts SEM images and permeability data of material systems according to embodiments of the disclosure.

Figure 13:
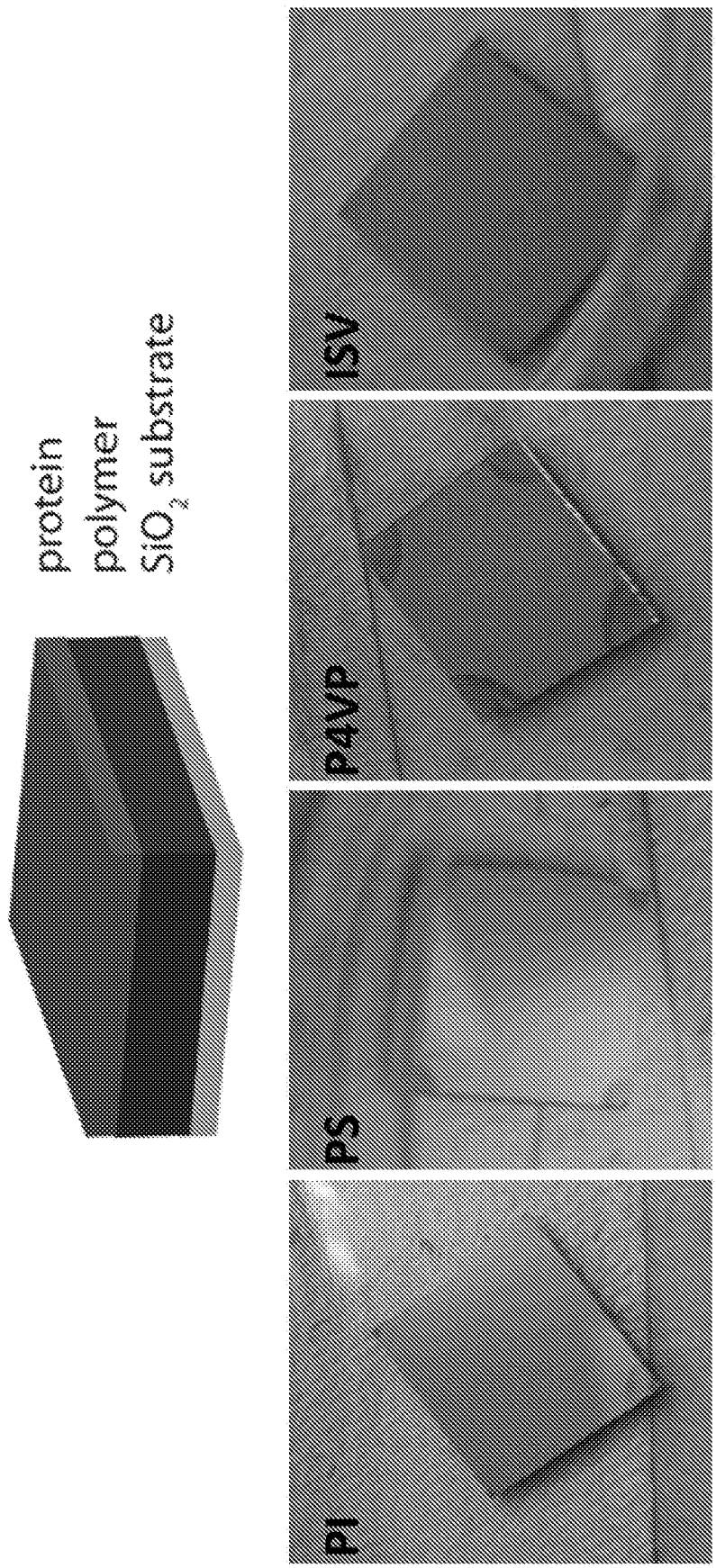

FIG. 13 depicts an example material system according to an embodiment of the disclosure.

Figure 14:
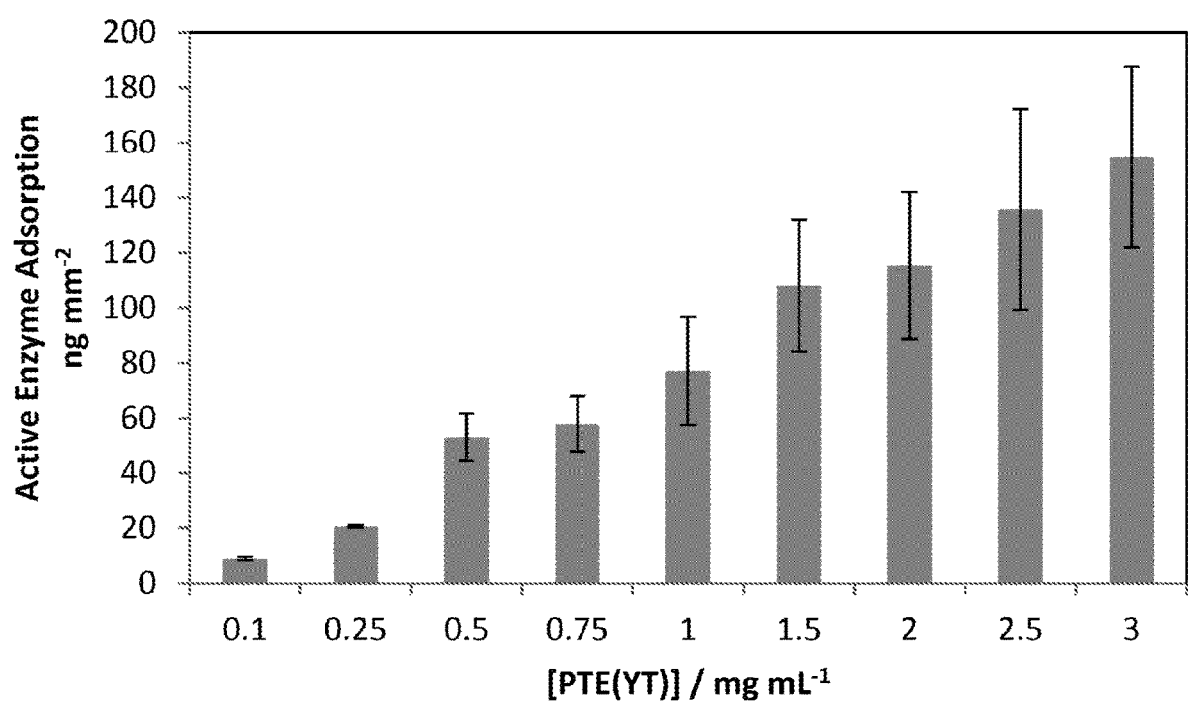

FIG. 14 depicts enzyme activity data of material systems according to embodiments of the disclosure.

Figure 15A:
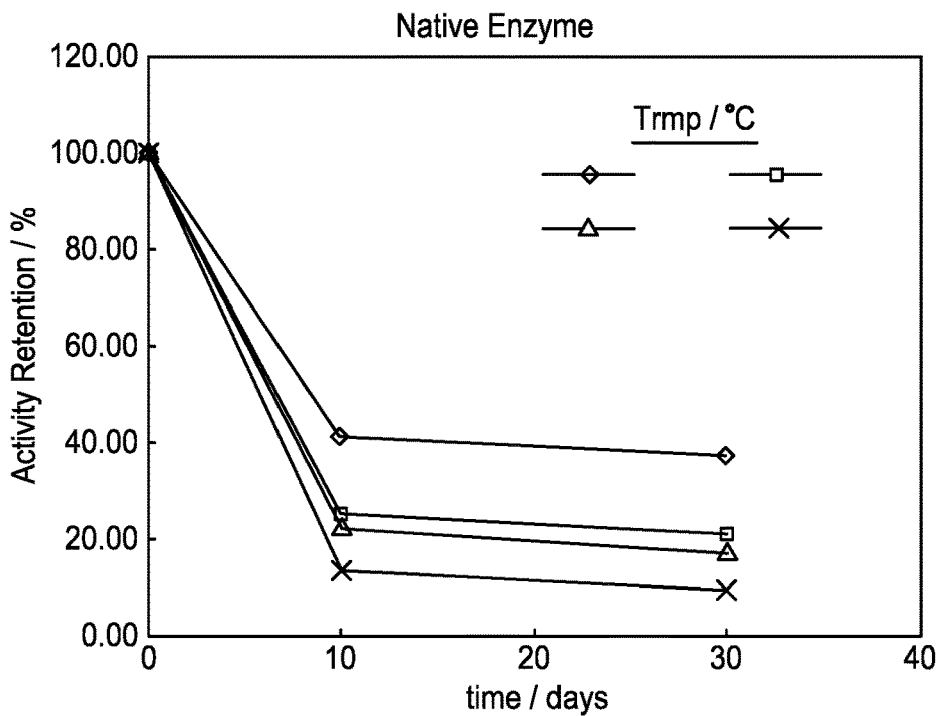
Figure 15B:
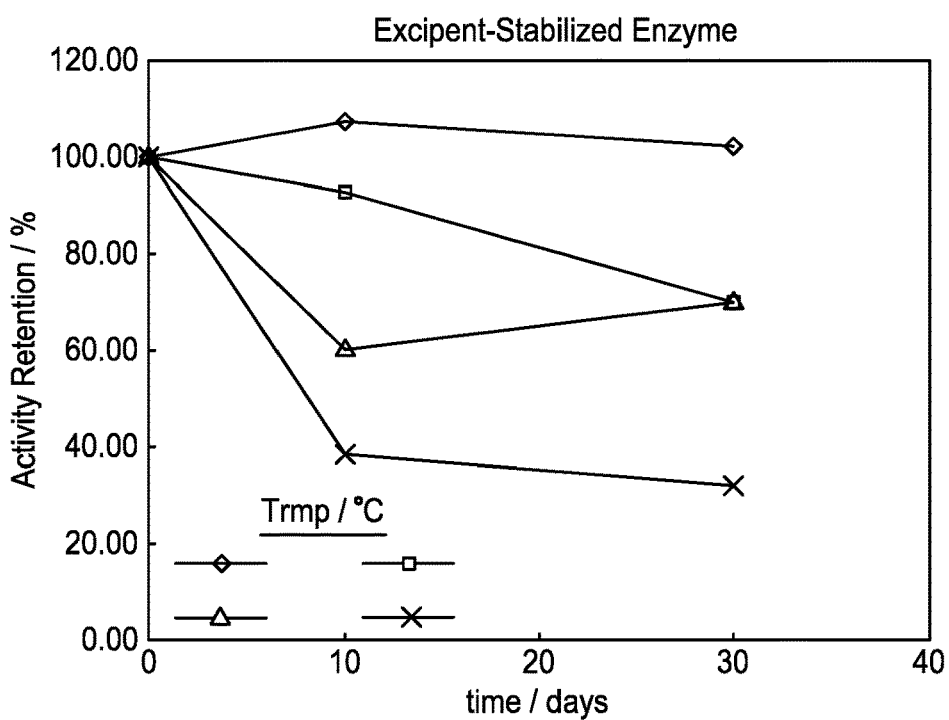

FIGS. 15A and 15B provide enzyme activity data of stored material systems according to embodiments of the disclosure.

FIGS. 16-24 are representations of data acquired in accordance with embodiments of the disclosure.

DESCRIPTION

The present disclosure provides autonomous localized permeability material systems and methods for using and making same. In accordance with example implementations, these systems can be used as part of a protective material which only at the point of contact with a reagent, locally switches into a closed protective state. Other example configurations include but are not limited to industrial and/or recreational uses.

In accordance with example implementations, the material systems of the present disclosure can include a dynamically permeable porous material, and one or more immobilized reagents operatively associated with the porous material in sufficient proximity to trigger a localized change in material pore size upon reagent reaction. The material systems can be considered membranes and/or membrane systems. The material systems can be an entirety of a material or a portion of a material, such as a layer of same.

The material systems of the present disclosure can be considered an autonomous self-decontaminating selectively responsive porous material system that senses and reacts with target analyte(s) in the environment to produce triggers for material response.

The responsive porous material can include immobilized reagent(s) chemically configured to recognize and/or convert target analytes (reactants) into chemical triggers. The target analytes or reactants can include but not limited to the chemical warfare agents sarin, soman, sulfur mustard; pesticides parathion, paraoxon, diisopropyl fluorophosphate, and biomolecules including glucose, carbon dioxide, and glutathione. These reactants can be converted into triggers to actuate a material response such as the modulation of porosity of the material.

Figure 1:
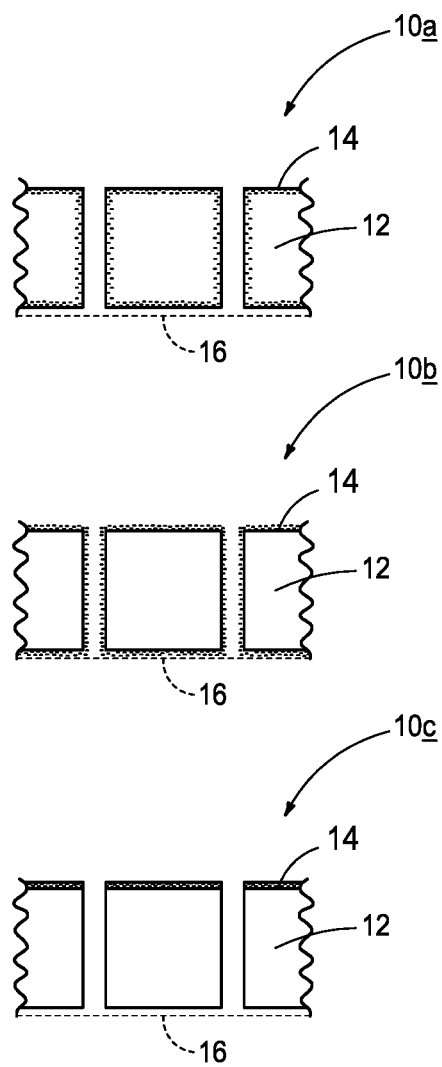
FIG. 1 depicts a series of material systems according to multiple embodiments of the disclosure.

Referring to FIG. 1, example implementations 10*a*, 10*b*, and 10*c* are depicted. While these implementations are not exhaustive, as others are envisioned, these three provide a sound basis to support the disclosure. Porous material 12 can include, but is not limited to materials that may have narrow pore size distribution in the nanometer range and high separation efficacy with the mechanical robustness of a rubber-toughened glassy polymer matrix, for example. The porous material can include block copolymer porous materials characterized by meso to microporous and even nanoporous size configurations.

As one example, triblock terpolymer such as poly(isoprene-b-styrene-b-4-vinylpyridine) (ISV) (P4VP) can serve as the basis for the porous material.

In accordance with other implementations, ISV can be the porous material. The P4VP part of the ISV can also be 3-amino or 2-amino pyridine, as shown in the tetrablock quarterpolymer. Other embodiments of the responsive polymer include isoprene-styrene-PDMAEMA and isoprene-styrene-HEMA, both of which are triblock terpolymers.

ISV pKa (P4VP) = 4.6

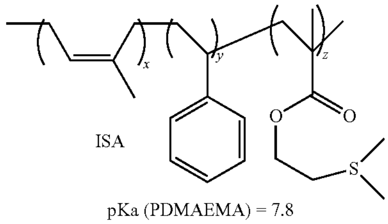

ISA pKa (PDMAEMA) = 7.8

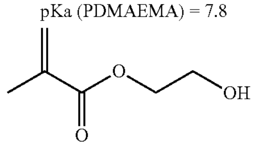

(Hydroxyethyl)methacrylate

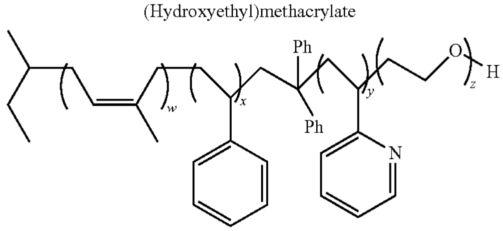

With reference to 10*a*, porous material 12 may have reagent 14 integrated therein with at least some of reagent 14 being located sufficiently proximate a surface of porous material 12 to react with a reactant upon exposure of the system to the reactant. This form of integration can be the modification of the porous material itself, such as the modification of the terminal ends of block polymers used in formation of the porous material. For example, reagents may be included during the porous material forming process, such as at least partially inorganic materials that may remain reactive upon porous material formation. Such materials can include metals and/or metal organic frameworks.

In accordance with example implementations, the immobilized reagent can be stoichiometric or catalytic. The immobilized reagent can include one or more of enzymes, metal organic frameworks, metal oxides, nucleophilic amines, and oximes. In accordance with example implementations, the reagent can generate products, such as stimulus (triggers), upon reaction with the reactant; the reaction products can include but are not limited to acids, bases, and/or thiols. Other implementations of the disclosure include systems with reagents that degrade reactants but generate by-products that have no impact on the porous material. In some of these configurations, multiple reagents can be incorporated, with at least one reagent generating a product upon exposure to a reactant, and the product initiating a change in the porous material.

With reference to 10*b*, porous material 12 may have reagent 14 bonded and/or adsorbed thereto. The bonding may be covalent in nature and/or non-covalent. Just one example of the reagents that may be bonded to the porous material include a hydrolase such as a phosphotriesterase enzyme, haloalkane dehalogenase enzyme or other enzymes.

With reference to 10*c*, porous material 12 may have another layer bonded thereto that may include integrated and/or bonded reagents 14. In accordance with example implementations, one or more of the implementations of 10*a*-10*c* can be supported by another layer 16. Layer 16 may be woven nylon for example.

The porous material can respond to exposure to triggers including but not limited to pH, redox potential, and group polarity. The reagents immobilized with the material can be selected and/or configured to produce products that initiate such triggers (pH changes for example).

Operatively associated with the porous materials can be specified reagents. With reference to FIG. 1, as stated above, the reagents (catalysts in some examples) can be enzymes. These enzymes can display high reactant (substrate) specificity and fast response times.

Select variants of these reagents are capable of generating large changes in pH with reactant (substrate, for example) specificity and response times toward a number of chemical and biological agents of interest. In accordance with example configurations, coupling the selectivity and response of enzymes with stimuli responsive materials, the dynamic material system can be prepared which responds only to reactants (e.g., enzyme substrates) with high sensitivity. Phosphotriesterase (PTE, EC 3.1.8.1) can be selected for the rapid detoxification of a wide range of reactants such as organophosphate pesticides and chemical agents. Hydrolysis of these reactants via PTE catalysis can generate strong and weak acid products. Incorporation of PTE into the ISV materials can effectively create a lock-and-key-type permeability barrier to chemical diffusion.

The materials are compatible with large area fabrication and integration with other support and protective materials to achieve required properties including material strength, moisture vapor transmission rates (MVTR), as well as fast response times. In accordance with example implementations, the material system can include the porous material on nylon-based support structures, such as casting on macroporous woven nylon support layers. The material system can have an elastic moduli of greater than 300 MPa.

Figure 2:
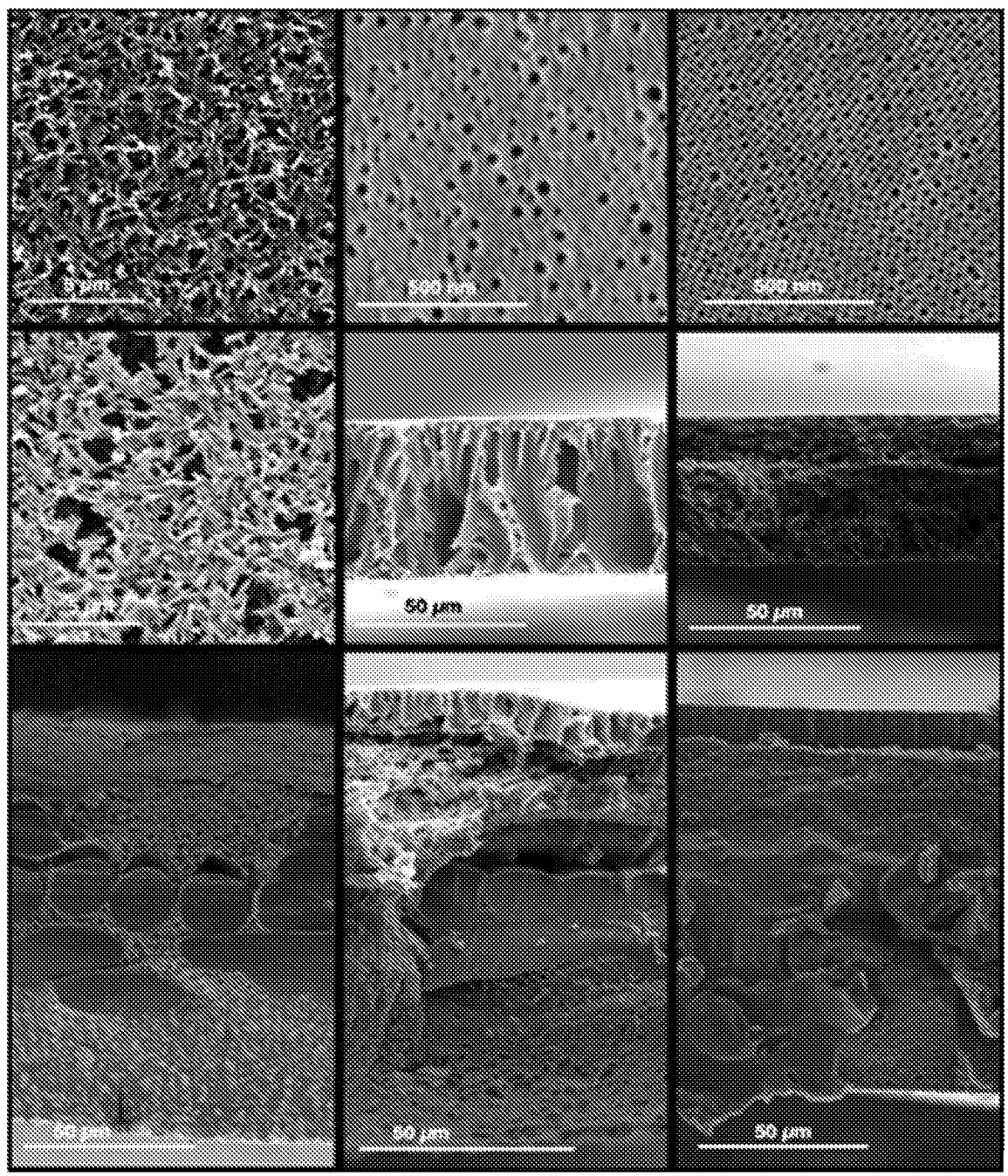
FIG. 2 depicts SEM images of material systems according to embodiments of the disclosure.

With reference to FIG. 2, SEM structural characterization of nylon support (left, top: 0.1 µm top surface; middle: 0.2 µm top surface; bottom: 0.2 µm cross section), nylon-supported material system with finger-like substructure (middle), and material system with sponge-like substructure (right) are shown. For material system images, top: surface structure, middle: neat material system cross section, bottom: cross section of nylon supported material systems (material surface morphology and cross section can be characterized by field emission scanning electron microscopy (Tescan Mira$_3$ FESEM). Sample surfaces can be coated with gold palladium at a current of 40 mA for 6 seconds (Denton Vacuum Desk II) prior to imaging. Average pore sizes from FESEM micrographs can be analyzed with Mathematica. Transmission Electron Microscopy (TEM) can be performed using a JEOL 2000 EX electron microscope operated at 200 kV. Imaging can be done by amplitude and phase contrast, and images can be acquired using a Gatan Orius SC600 high-resolution camera. Samples can be stained for 2-30 seconds with Phosphotungstic Acid (PTA) to increase the contrast between the P$_4$VP/enzyme components and the porous material.

Figure 3:
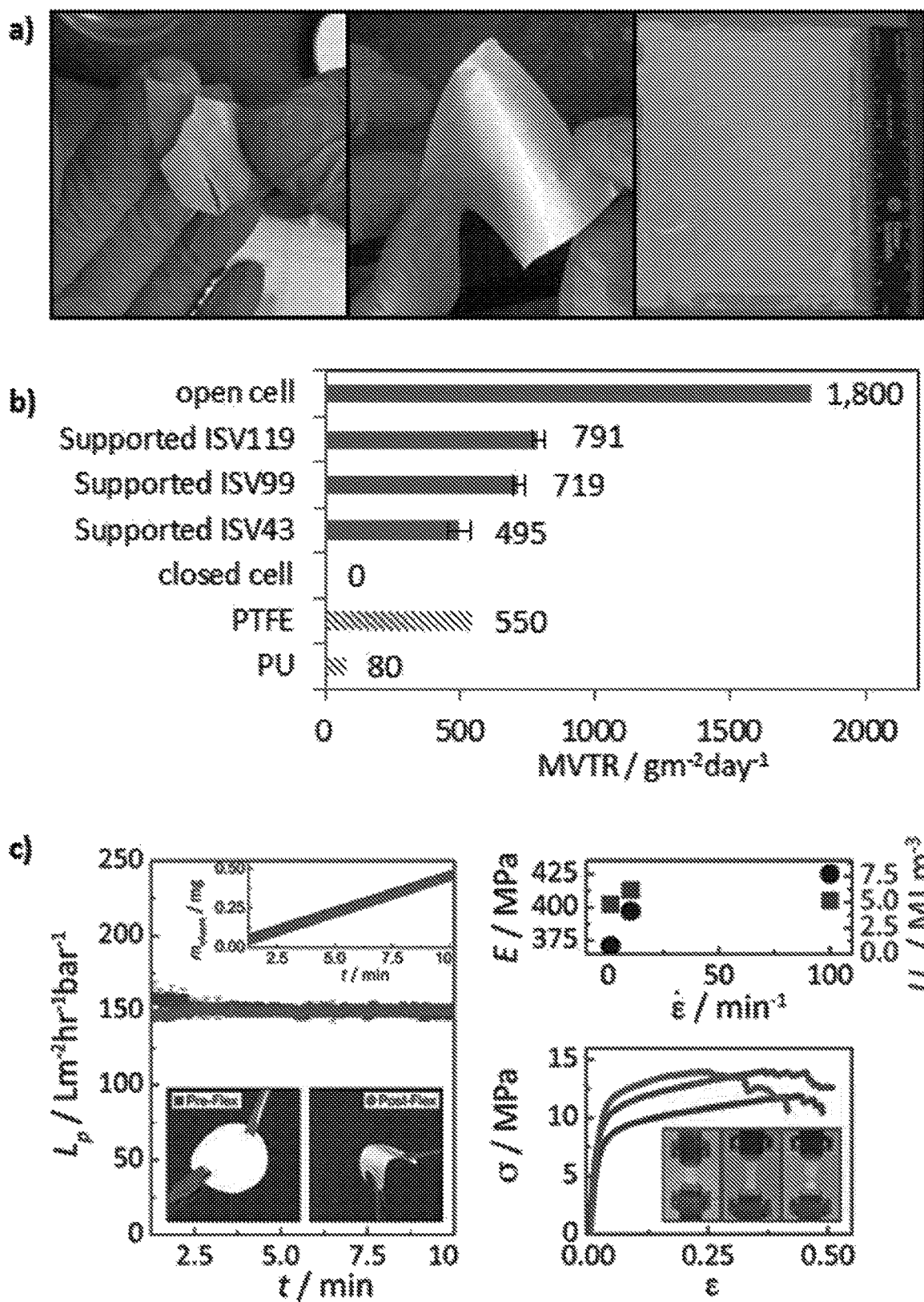
FIG. 3 depicts images and data relating to material systems prepared according to embodiments of the disclosure.

With reference to FIG. 3, the material systems can be pliable yet robust; maintaining physical and mechanical integrity under extensive experimental manipulation, including permeability testing under pressures up to 30 psi. Systems were found to exhibit "open" state permeability in excess of Lp=200 Lm$^{-2}$hr$^{-1}$bar$^{-1}$ and the fidelity of pH-induced permeability changes can exceed 1 db. Permeability and transduction characteristics can be uniform across large area material systems.

Figure 4:
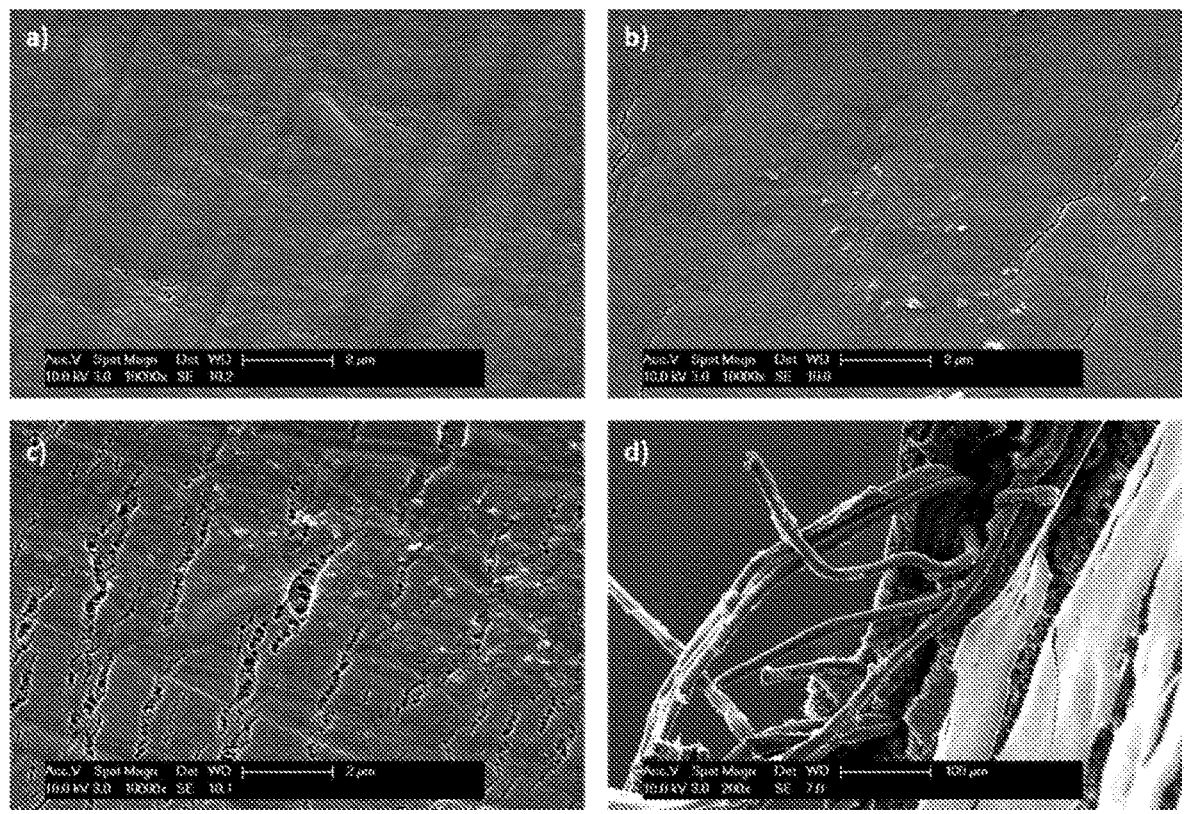
FIG. 4 depicts SEM images of material systems according to embodiments of the disclosure.

Critical textile properties of the material systems can be evaluated including moisture vapor transport rate (MVTR), intrinsic water vapor resistance and durability (FIG. 3 b, c, FIG. 4). With reference to FIG. 3, textile properties of material systems were characterized. In FIG. 3 a) brittle character of neat material system (left), pliable quality of nylon supported material system (middle), and scale-up potential of material systems via large area (4"×5") blade casting (right) are depicted. In FIG. 3 b), moisture vapor transport rates (MVTR) based on the British Standard BS 7209 of supported ISV systems and commercial materials (PTFE, PU) are depicted by way of bar graph. In FIG. 3 c), supported material system permeability profile post flexes testing (left) and tensile testing (right) are shown.

Referring next to FIG. 4, SEM micrographs of supported material system before and after durability testing are shown. With reference to FIG. 4 a), top surface of material system prior to testing is shown.

In FIG. 4 b), top surface of material system post flex testing is shown. In FIG. 4 c), top surface of material system post tensile testing is shown. In FIG. 4 d), a cross section of material system at rupture point post tensile testing is shown.

In general, material systems can provide MVTR values similar to those of standard commercial textiles, such as PTFE (MVTR ~550 g/m2/day). Evaluation of MVTR across several material systems compositions (ranging in molecular weight from 43, 99, and 119) revealed a range of accessible vapor transport (~500-800 g/m2/day) and demonstrated the tunable properties of the material systems as a function of polymer molar mass, casting conditions and material system pore size. Elastic moduli (E~400 MPa) and ductility (λ max~0.5) were found to be comparable to commercial materials, such as GoreTex™, and approximately independent of strain rate. Permeability response of the supported material systems can be practically unaffected by repeated (10×) flex deformation to film curvatures of 3 cm$^{-1}$. The scalability of the material system can be demonstrated through the fabrication of mid-gauge material system swatches. These samples can be produce, in a single continuous casting process, measuring approximately 4"×5" and displaying virtually the same homogeneity, consistent pore structure, and permeability response observed at smaller scales.

Figure 5:
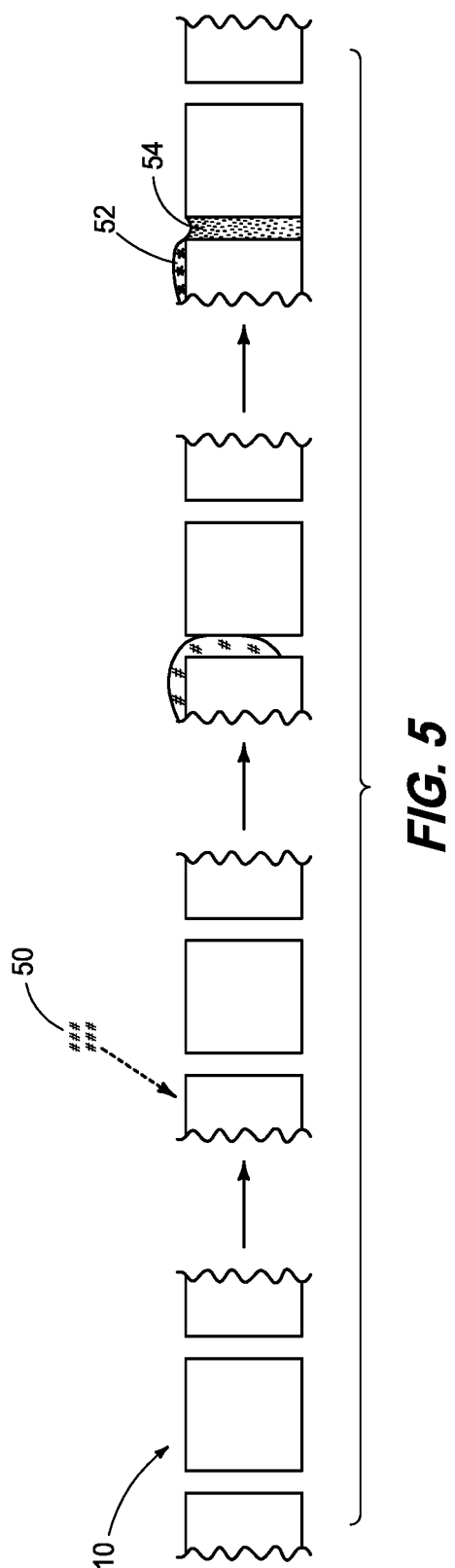
FIG. 5 depicts a sequence of reactant exposure to material systems of the present disclosure.

Referring to FIG. 5, a series of material system configurations are presented from left to right depicting exposure of material systems of the present disclosure to reactants. In accordance with example implementations, material system 10, supported or unsupported, can be exposed to reactant 50. Example reactants are described herein, and can include but are not limited to; materials hazardous to human health, such as organophosphorous neurotoxins.

As described herein, material system 10 can include reagents and upon exposure to one or more of these reagents, a product 52 is formed. Product 52, may, for example be a by-product of the degradation of a reactant, such as protons upon the degradation of an organophosphorous neurotoxin when reacted with a phosphotriestrerase reagent. This product can initiate the porous material to locally swell or collapse, modulating permeability as shown in swollen portion 54. In accordance with this example, the product can be acidic and the pores of the porous material can swell and close upon decrease in pH. Where the porous material is formed of poly(4-vinylpyridine), chains of the poly(4-vinylpyridine) may stretch to close the pores, for example.

Autonomously, the material systems of the present disclosure can degrade a material hazardous to human health to non-hazardous material and also prevent the hazardous material from traversing the material system. As FIG. 5 depicts, this modulation can occur locally to the areas exposed to the reactant.

These material systems may be considered actively-gated material systems with molecular recognition that mimics skin-like functionality by integration of enzymes into mesoporous and pH-responsive asymmetric polymeric films. Theses bio-mimetic material systems can perform a rapid and spatially selective response to specific threat agents and can be integrated into robust material systems consistent with clothing, suit, mask, and/or protective textile applications.

Figure 6:
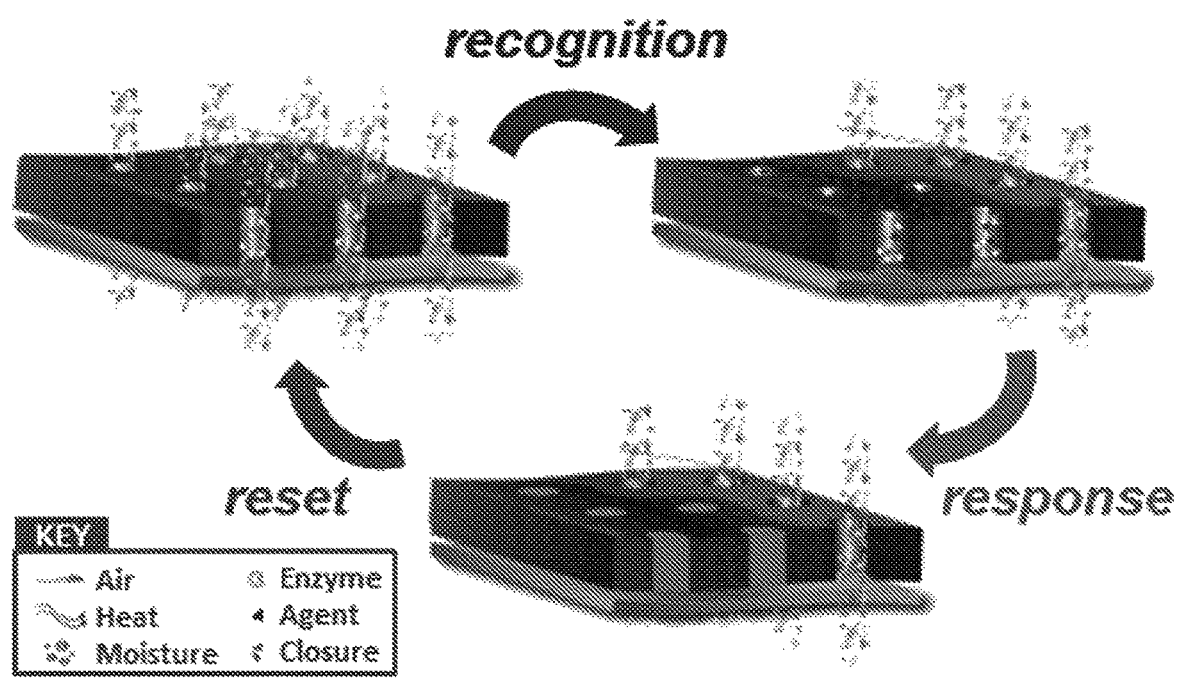
FIG. 6 depicts another sequence of reactant exposure and reset according to an embodiment of the disclosure.

Referring to FIG. 6, at least one artistic impression of the material system of the present disclosure being cycled or modulated between open and closed configuration upon exposure to a reactant (agent) is shown. As can be seen, the material may be reset upon changes in environment.

Figure 7A:
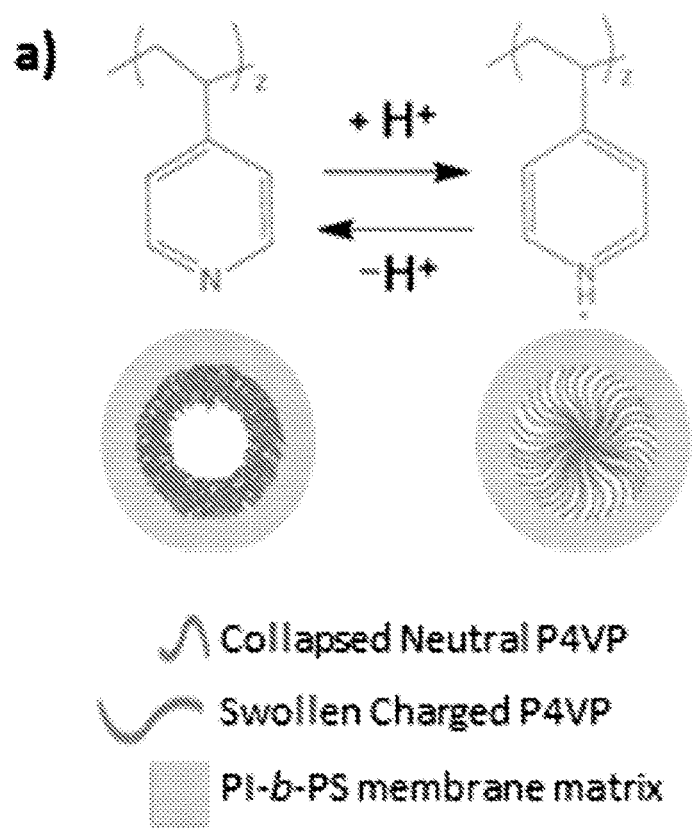
FIGS. 7A and 7B depict open and closed configurations of porous material as well as data associated with same according to an embodiment of the disclosure.
Figure 7B:
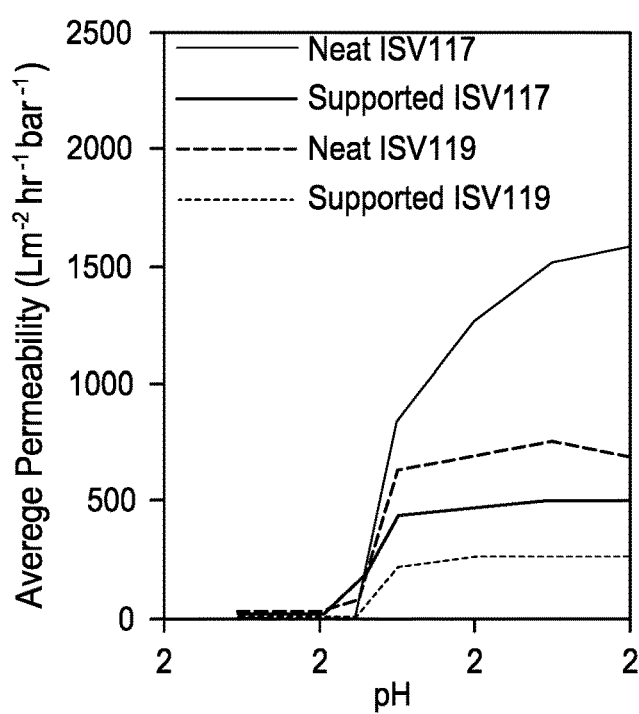

The porous material of the material system can be sensitive to environmental changes and the products of the reactants and the reagents can provide these changes. With reference to FIGS. 7A and 7B, for example, the sensitivity of 4-vinylpyridine (pKa 5.62) to protonate, mesoporous ISV material permeability (Lp) can be highly pH-sensitive. The material systems featured a rapid and effective transition between "open" and "closed" states upon pH change from Lp=1522 Lm$^{-2}$hr$^{-1}$bar$^{-1}$ (at pH=7) to Lp=11 Lm$^{-2}$hr$^{-1}$bar$^{-1}$ (at pH=3), perhaps as a result of electrostatic repulsive interactions leading to the poly(4-vinylpyridine) chain stretching in the mesopores.

FIGS. 7A and 7B depict the characterization of native ISV behavior and structure: 7A; pH dependent behavior of the P4VP block of materials system; pores in open (deprotonated) and closed (protonated) states provide material system permeability changes 7B; material system permeability of neat and supported material systems in buffer solution as a function of pH.

Figure 8:
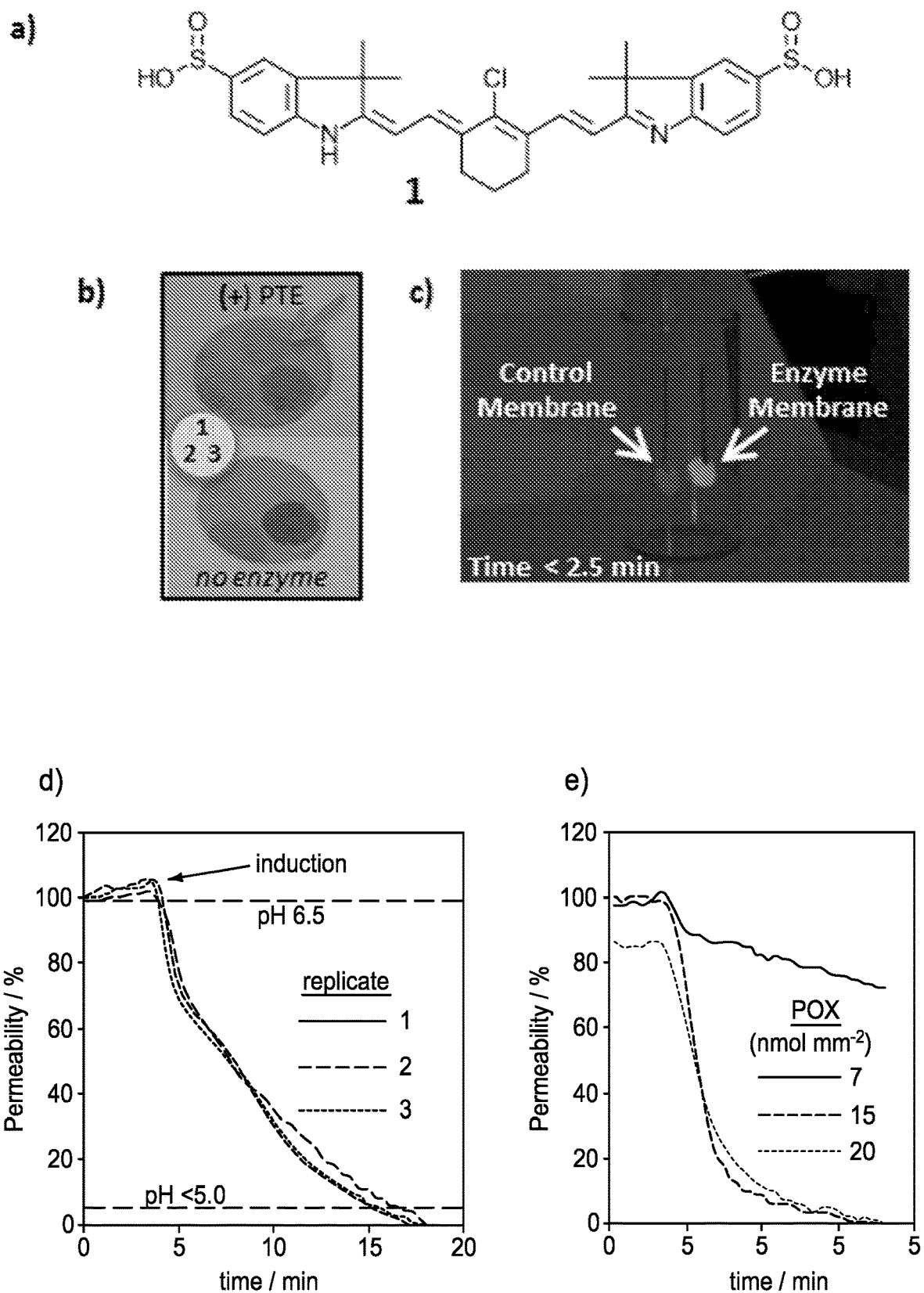
FIG. 8 depicts data indicating the permeability of material systems of the present disclosure.

Referring to FIG. 8 a)-e), substrate induced dynamic permeability response of enzyme functionalized material system data is provided as follows: 8a) Cyanine dye structure for the colorimetric and fluorescent detection of environmental pH<4.5. 8b) Visualization of selective substrate turnover in the presence of active enzyme adsorbed on the surface of dyed material systems (cast from a 9% polymer solution). Test key: 1. 15.2 mM paraoxon in a 10% methanol water solution; 2. 1 M NaOH solution, 3. 1 M HCl solution. 8 c) Visualization of vapor-phase DFP substrate hydrolysis on dyed enzyme-containing material systems (cast from a 9% polymer solution) via fluorescence response. 8 d) Reduction in aqueous permeability of enzyme-functionalized material systems in response to enzyme substrate, 3.62 μM paraoxon. 8 e) Material system permeability response was directly related to the magnitude of the chemical challenge.

Visual detection of bound enzyme activity can be demonstrated through the use of a pH-sensing cyanine indicator dye (1) (FIG. 8 a). The structure of dye 1 was chosen for the pKa=4.7, which is close to that of the conjugate acid of $P_4VP$ that drives the porous material permeability transition. Upon acidification, the absorption peak of dye 1 shifts from red ($\lambda$ abs=755 nm, pH>5) to blue ($\lambda$ abs=513 nm, pH<5) and fluorescence emission is increased in the near-IR region ($\lambda$ em=773 nm). These spectroscopic changes in the dye were used to confirm enzyme function under various conditions and predict potential modulation in the ISV material permeability.

With reference to FIG. 8 b), functionalized-material systems were treated with organophosphate substrates, acid and base. Acids quickly turned both native and enzyme-treated material system blue. Aqueous base did not alter material color. Paraoxon (pKa>5), a PTE substrate, produced an indicative "positive" blue response in only those samples pre-treated with enzyme. Samples without enzyme remained unchanged. Enzyme response was also confirmed for vapor-phase agents using the volatile simulant diisopropylfluorophosphate (DFP). Materials pre-functionalized with enzyme produced a fluorescent response to DFP vapor while material systems without enzyme remained unchanged (FIG. 8 c). In addition to positive enzyme function, observation of the dry material systems allowed for visualization of response location. Color change of the indicator exclusively in the agent-treated area validated the high spatial selectivity to the immediate zone of contamination, an aspect of the desired material function.

Transduction of enzyme-mediated substrate hydrolysis into a permeability response can be evaluated by measurement of the pressure-driven water flux across material systems in aqueous solution at varying simulant concentration. Within one minute a reduction of liquid permeability to about 1 dB of the original value can be observed, demonstrating the rapid self-regulating characteristics of enzyme-actuated material systems (FIG. 8 d). The rate and magnitude of response increased in correlation with stimulant challenge (FIG. 8 e). Final material system flux can be equivalent to the simulated "closed" system (<pH 4.5). The permeability transition can be considered stable and highly reproducible with negligible loss of enzyme activity or reduction in the level of material responsivity through several cycles of material system reset (wash solution p>5) and repeat agent exposure.

In accordance with example implementations, materials system 10 can be prepared by operatively associating immobilized reagents with a dynamically permeable porous material. These methods can include first preparing the dynamically permeable porous material and then operatively associating reagents with the porous material. These methods also include integrating the reagents with the porous material, and these methods also can include providing another material, such as a layer upon the porous material with the layer including immobilized reagents. For example, this layer may be considered a reagent support material and this reagent support material may be operatively associated with the porous material. In the above example implementations, at least a portion of the reagents may be immobilized when associated with the porous material.

In accordance with at least one example implementation, non-solvent induced phase separation can be used to form the dynamically permeable porous material from triblock terpolymers. Porous materials can be prepared using SNIPS (self-assembly with non-solvent induced phase separation) of five ISV terpolymers (triblock terpolymers such as poly(isoprene-b-styrene-b-4-vinylpyridine) with molar masses in the range of 40-120 kg/mol ($ISV_{43}$, $ISV_{99}$, $ISV_{117}$, $ISV_{118}$ and $ISV_{119}$). The porous material exhibited a hierarchical structure that can include a thin top surface separation layer of vertically aligned uniform mesopores and a substructure of graded meso- to macropores, with all surfaces lined by the poly-4-vinylpyridine (V) block of the terpolymer.

Two types of substructures with either a densely packed "sponge-like" or largely open "finger-like" morphology can be observed depending on fabrication conditions. Variation in polymer composition and porous material casting conditions can be used to control pore size, shape, density and substructure architecture to match the permeability profile of the resulting porous material to respective specifications.

Preparation of the triblock terpolymer ISV and mesoporous asymmetric membranes derived from ISV can be performed in accordance with Tuning Structure and Properties of Graded Triblock Terpolymer-Based Mesoporous and Hybrid Films, Nano Lett, 2011, 11 2892-2900 and/or Understanding the Structure and Performance of Self-Assembled Triblock Terpolymer Membranes, J. Membrane Sci. 2013, 444, 461-468 the entirety of each of which is incorporated by reference herein.

In accordance with example implementations, multiple ISV triblock terpolymers can be synthesized by anionic polymerization. Total number average molar mass, $M_n$, weight fraction, f, and polydispersity index, PDI, for these terpolymers as experimentally determined by gel permeation chromatography (GPC) and proton nuclear magnetic resonance ($^1H$ NMR) are summarized in Table 1 below.

TABLE 1

ISV terpolymer characteristics.

| Sample | $M_n$ [kg mol$^{-1}$] | $f_{PI}$ | $f_{PS}$ | $f_{P4VP}$ | PDI |
|---|---|---|---|---|---|
| ISV43 | 43 | 0.24 | 0.56 | 0.20 | 1.02 |
| ISV99 | 99 | 0.23 | 0.63 | 0.14 | 1.20 |
| ISV117 | 117 | 0.26 | 0.60 | 0.14 | 1.13 |
| ISV118 | 118 | 0.21 | 0.67 | 0.12 | 1.12 |
| ISV119 | 119 | 0.19 | 0.65 | 0.16 | 1.17 |

The porous materials can be fabricated by employing a combination of self-assembly and non-solvent induced phase separation, now referred to as SNIPS. An ISV polymer casting solution can be prepared by dissolving ISV polymer into a co-solvent mixture comprised of a 7:3 ratio (by weight) of 1,4-Dioxane (DOX) and tetrahydrofuran (THF). The solution can be pipetted onto a glass substrate for neat, unsupported material. Supported material can be cast directly onto porous nylon substrates, purchased from Sterlitech Inc., taped to glass substrates. The polymer solution can be cast by a doctor blade with a gate height of 220 μm and allowed to evaporate for a specified amount of time before the films are immersed into a deionized water bath. Unless mentioned otherwise, materials can be cast from a 16% ($ISV_{43}$), 12% ($ISV_{99}$ and $ISV_{118}$) or 11% ($ISV_{117}$ and $ISV_{119}$) (by weight) polymer solution. These materials can be cast on top of a 0.2 μm ($ISV_{117}$), 0.1 μm ($ISV_{43}$, $ISV_{99}$, $ISV_{119}$) or 0.04 μm ($ISV_{118}$) nylon support.

Figure 9:
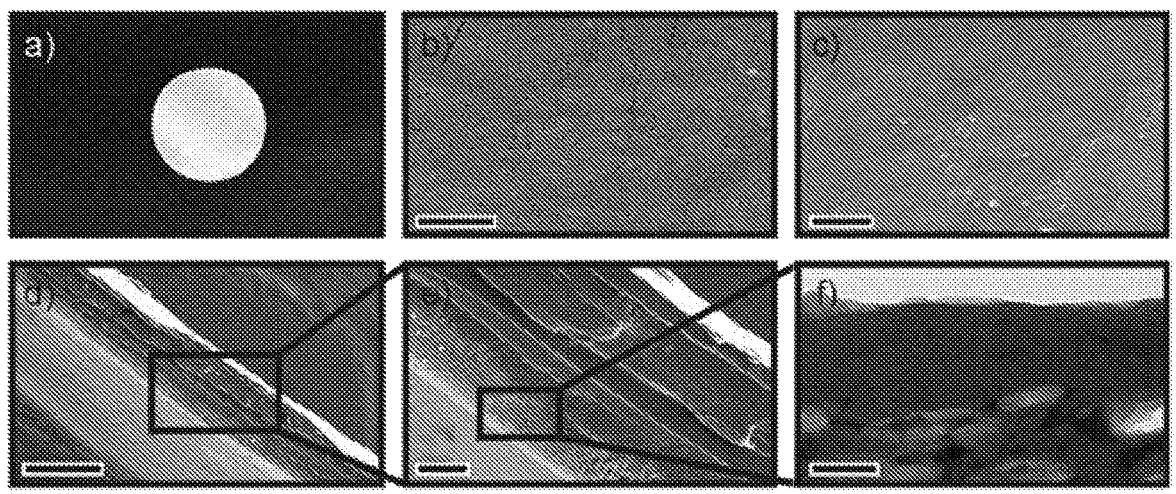
FIG. 9 depicts SEM images of material systems according to embodiments of the disclosure.

Referring to FIG. 9a)-f), SEM images are provided of prepared materials; 9a), image of $ISV_{119}$ material cast on nylon; 9b) & c), SEM micrographs of the top surface of $ISV_{119}$ material; 9d) & e), SEM micrographs of the cross section of the $ISV_{119}$ material; 9f), TEM micrograph of $ISV_{118}$ material separation layer stained with PTA.

Referring to FIGS. 10A and 10B as well as 11a) and 11b), materials cast from $ISV_{117}$ and $ISV_{118}$ can exhibit an open "finger-like" substructure while materials cast from $ISV_{43}$, $ISV_{99}$ and $ISV_{119}$ can provide a dense "sponge-like" substructure. FIG. 10A depicts SEM micrographs of neat cross sections of $ISV_{117}$ material with "finger-like" substructure (left) and $ISV_{119}$ material with "sponge-like" substructure (right). FIG. 10B depicts the permeability of neat $ISV_{117}$ and $ISV_{119}$ materials in buffer solution as a function of pH. Referring to FIG. 11: a) depicts SEM micrographs of the surface morphology and neat cross section of $ISV_{118}$ material with "finger-like" substructure and b) depicts permeability in buffer solution as a function of pH for supported $ISV_{118}$ material cast on 0.04 μm nylon supports.

Additional values for the absolute permeabilities in the "open" and "closed" state of neat and supported $ISV_{117}$ and $ISV_{119}$ materials are indicated in Table 2 below.

TABLE 2

Absolute permeabilities in the "open" and "closed" state of neat and supported $ISV_{117}$ and $ISV_{119}$ materials.

|  | "open" state (pH = 7) ($Lm^{-2}hr^{-1}bar^{-1}$) | "closed" state (pH = 3) ($Lm^{-2}hr^{-1}bar^{-1}$) |
| --- | --- | --- |
| Neat ISV117 | 1522 | 32 |
| Supported ISV117 | 504 | 27 |
| Neat ISV119 | 747 | 29 |
| Supported ISV119 | 257 | 11 |

Referring to FIG. 12, a) depicts SEM micrographs of $ISV_{117}$ materials cast from 11% (left) and 9% (right) polymer solution with "finger-like" cross sections of neat $ISV_{117}$ materials (bottom). The top images show surface morphology of nylon-supported $ISV_{117}$ materials. b) depicts permeability of supported $ISV_{117}$, casted from 11% and 9% polymer solution, materials in buffer solution as a function of pH. With particular reference to FIG. 12, a) materials cast from $ISV_{117}$ at 11% (left) and 9% (right) polymer solution have similar surface morphologies and "finger-like" substructures. These materials perform similarly (i.e. permeability as a function of pH) but differ in absolute permeability values due to polymer concentration. It is assumed here that materials cast from solutions that vary slightly in polymer concentration have similar properties and performance values.

Additional values for the absolute permeabilities in the "open" and "closed" state of neat and supported $ISV_{118}$ materials are provided in Table 3 below.

TABLE 3

Absolute permeabilities in the "open" and "closed" state of neat and supported $ISV_{118}$ materials.

|  | "open" state (pH = 7) ($Lm^{-2}hr^{-1}bar^{-1}$) | "closed" state (pH = 3) ($Lm^{-2}hr^{-1}bar^{-1}$) |
| --- | --- | --- |
| Neat ISV118 | 1082 | 10 |
| Supported ISV118 | 491 | 15 |

Preparation of the material system can also include adsorbing the reagents to the porous material. This can include covalently bonding the reagents to the porous material as well as integrating the reagent into the porous material. Accordingly, the reagents can be immobilized on to the surface of the material using methods including but not limited to adsorption, bio-affinity or covalent conjugation. As described, the reagent can include more than one co-immobilized reagent including but not limited to enzymes, metal organic frameworks (MOFs), metal oxides, nucleophilic amines and oximes.

Adsorption can be used as a reagent (enzyme) immobilization method to attach a broad array of protein structures to polymer surfaces. Enzyme coupling can be accomplished by immersion of porous materials into concentrated enzyme solutions, harnessing the strong interactions between enzymes and $P_4VP$ on the outer surface of the ISV material. Coupling can also be accomplished by dropcasting, printing or other similar deposition methods.

To impart target-specific response characteristics, supported ISV materials can be conjugated to hydrolase enzymes, which have demonstrated use in the identification, quantitation, and decontamination of threat agents. In specific embodiments, due to the pH-based material response mechanism, functionalization of the ISV material may focus primarily on enzymes that act on relevant substrates to produce highly acidic products.

In accordance with example implementations, porous materials can be incubated in solutions of PTE enzyme (1-20 mg $mL^{-1}$, 10 mM CAPSO, pH 9.4, 500 μL per 100 $mm^2$ material system surface area) for 16 hours at 4° C. on an orbital shaker at low speed. For samples containing dye 1, 100 μL of a 10 mg $mL^{-1}$ stock solution in water can be added to the protein solution for every 100 $mm^2$ material system surface area. Post-immobilization, samples can be washed (3×) with 10 mM CAPSO, pH 9.4 buffer for 30 minutes at 4° C. on an orbital shaker at low speed prior to testing.

Direct phosphotriesterase hydrolysis assays can be performed on a Molecular Devices SpectraMax $M_2^e$ spectrophotometer in 96 well plates for solution-phase enzyme samples (100 μL reaction volume, 0.35 mm path length, 5 min kinetic duration) and on a Beckman Coulter DU530 UV/VIS spectrophotometer, transferring aliquots of assay solution samples to a cuvette for solid-phase enzyme samples (1 mL volume, 1 cm path length, 10 min kinetic duration). All assays can be completed at 25° C. against ethyl paraoxon and the rates measured by monitoring the release of p-nitrophenol ($\epsilon405=17100$ $M^{-1}cm^{-1}$). Substrate stock solutions can be prepared by the dissolution of diethyl paraoxon in dry methanol (152 mM) followed by dilution of the methanol stock in deionized water (15.2 mM). For the enzymatic reaction, aliquots of the 15.2 mM paraoxon stock can be added to a mixture of enzyme in reaction buffer (50 mM CAPSO, 50 µM $CoCl_2$, pH 9.0) to give a final concentration of 1.52 mM. A dilution series of enzyme concentrations can be used for solution-phase samples (final enzyme concentrations range from 1 ng-10 µg $mL^{-1}$) to achieve a linear rate. For solid-phase samples, a section of material can be submerged in an adequate volume as to maintain a linear rate over the course of the kinetic assay (typical conditions: 3 mm diameter circle, 2 mg $mL^{-1}$ enzyme incubation, 12 mL assay buffer). The initial enzymatic rates can be corrected for the background rate of spontaneous paraoxon hydrolysis in the absence of enzyme. Specific activity values of the solution-phase samples can be calculated using the following formula:

Specific Activity (umol $min^{-1} \cdot mg^{-1}$)=$\Delta mAU$ $min^{-1} \times (1 \times 10^6) \times DF \times (1000 \times 17100 \times 0.35 \times C)^{-1}$, where $\Delta mAU$ $min^{-1}$=$\Delta mAU$ $min^{-1}$ test–$\Delta mAU$ $min^{-1}$ blank, DF is the dilution factor, 17,100 $M^{-1}$ $cm^{-1}$ is the molar extinction coefficient of p-nitrophenol, C (in mg $L^{-1}$) is the protein concentration of enzyme stock solution and 0.35 cm is the path length of light.

Quantitation of active enzyme loading of solid-phase samples can be calculated using a calibration curve prepared from the rates of enzymatic paraoxon hydrolysis (linear regression of absorbance vs. time) for a series of solution-phase enzyme standards of known concentration and identical specific activity as that incubated with the material system. The resulting equation can then be compared against the hydrolysis rates obtained for the solid-phase samples to calculate enzyme mass loading (ng) per unit area ($mm^2$).

Referring to FIG. 13, images of protein adsorbed to homopolymer samples spun-cast on silicon wafers are provided. Thickness measurements of enzyme coatings adsorbed on $P_4VP$ reference films using ellipsometry (Table 3 (above)) revealed the formation of enzyme monolayers that were stable against desorption during repeated washing with deionized water, detergents, and ionic solutions with pH ranging between 4-10.

The ellipsometry measurements can be conducted using a Beaglehole Instruments Picometer phase-modulated ellipsometer equipped with a helium-neon laser ($\lambda$=632.8 nm). The angle of incidence was varied from 70-80°, and analysis was completed using TF Companion software (Version 3.0, Semicon Software, Inc.) and a four layer, homogeneous film model (semi-infinite silicon+silicon dioxide+polymer+adsorbed enzyme+semi-infinite air). Thin film material systems of PI, PS, $P_4VP$, and ISV with thicknesses between 10-20 nm can be spin cast from 0.1 wt. % solutions in toluene (PI, PS, and ISV) and a 1:1 mixture of acetone and ethanol ($P_4VP$) onto silicon wafers. The polymer-coated wafers can incubated in a solution of PTE enzyme (9.7 mg $mL^{-1}$, 10 mM CAPSO, pH 9.4) for 16 hours at 4° C. on an orbital shaker at low speed. The layer thickness can be successively determined for the silicon dioxide layer (2-3.5 nm), the material layer (10-20 nm), and the adsorbed enzyme. Literature values of refractive indices for PI (1.51), PS (1.59), $P_4VP$ (1.581), ISV (1.5707), and dry enzyme (1.53) were used for the analysis.

TABLE 4

Thickness values of silica layer on silicon support, homopolymer layer, and protein adsorption layer as derived from analysis of ellipsometry measurements.

| Material | Silica (Å) | Polymer (Å) | Protein (Å) | Protein (ng $mm^{-2}$) |
|---|---|---|---|---|
| Polyisoprene | 34.8 ± 0.4 | 98.9 ± 8.9 | 3.0 ± 2.3 | 0.39 ± 0.29 |
| Polystyrene | 26.2 ± 2.2 | 153.6 ± 8.2 | 24.0 ± 8.2 | 3.12 ± 1.06 |
| Poly-4-vinylpyridine | 20.0 ± 0.3 | 200.5 ± 5.2 | 35.8 ± 5.2 | 4.65 ± 0.67 |
| ISV | 21.1 ± 0.3 | 142.5 ± 2.2 | 23.6 ± 5.4 | 3.06 0.07 |

Referring next to FIG. 14, representative quantities of PTE(YT) enzyme adsorption per unit surface area (ng $mm^{-2}$) to supported $ISV_{119}$ according to solution-phase enzyme incubation concentration data is depicted. Referring to FIGS. 15A and 15B, data depicting stability of $ISV_{119}$-adsorbed PTE(YT) enzyme activity to dry storage conditions in the absence (a) or presence (b) of excipient is shown.

As shown, the material system retained activity in solution and upon drying, even after extended storage (FIGS. 14 and 15A-B). Enzyme stability during dry storage on supported $ISV_{119}$ materials can be assessed in the presence and absence of stabilizing excipient for a range of temperatures over a 30 day incubation period. Enzyme functionalized material systems can be prepared as described herein. Upon completion of the final rinse, excipient stabilized materials can be subjected to an additional incubation in a 1% collagen hydrolysate solution (3 mm diameter $ISV_{119}$, 500 uL solution, 30 min, 4° C.), after which both native and stabilized materials can be lyophilized to dryness and individually packaged under nitrogen in Mylar bags for storage.

Samples can be incubated at 4, 25, 40, or 60° C. for up to 30 days, with activity time points collected on days 0, 10, and 30. At each time point the enzyme activity can be assessed by >4 replicates. Pretreatment of samples with excipient significantly helped to maintain enzyme activity of the dried samples as measured on day 0.

As indicated, material system 10 can also include a support structure such as a nylon-based support structure. This support structure can be included before or after the association of the immobilized reagents.

Phosphotriesterase (PTE) can be obtained from Novozymes (Davis, CA) and exchanged into 50 mM potassium phosphate, 100 uM cobalt chloride, pH 8.0 for storage at 4° C. until use. Enzyme variants PTE(RN-YT) and PTE(C23) can be prepared in-house according to known procedures. pH-sensitive dye 1 can be custom synthesized and purchased from American Dye Source, Inc. (Quebec, Canada). Ethyl paraoxon (Chem Service, Inc., >98%), Diisopropylfluorophosphate (Sigma-Aldrich, >97%)

An evaporative dish method, based on the British Standard BS 7209, was used to determine the MVTR in material system samples. The Turl dish assembly consists of a dish, triangular support, and cover ring. The test specimen is comprised of two circular material system samples, with a total area of 402 $mm^2$, anchored to a circular transparency film, purchased from C-Line Products, Inc. (No. 60837), using epoxy. The test specimen was sealed over the mouth of the dish containing deionized water and the triangular support to maintain a ~10 mm air gap. The cover ring was placed above the test specimen and adhesive tape was applied around the circumference of the competed assembly. The assembly was positioned into a turntable and the experiment was conducted in a controlled atmosphere of 20° C. and 65% relative humidity. The assemblies were weighed on a balance with a resolution of 0.01 g. Each assembly was weighed daily up to five days in order to assure full equilibration. Data for calculation of MVTR values were taken on day five.

The MVTR(g m$^{-2}$ day$^{-1}$) was calculated as: MVTR=24M (At)$^{-1}$, where M is the loss in mass of water in grams, t is the time period in hours, and A is the area of the material system sample in m$^2$.

In addition to the three nylon-supported ISV materials (ISV$_{43}$, ISV$_{99}$, and ISV$_{199}$), dishes were evaluated in the open and closed states for reference. Values obtained from these measurements were used as benchmarks in addition to literature values reported for relevant commercially available material (i.e. PTFE and PU, see FIG. 3b).

Intrinsic water vapor resistance was calculated as: Ret=R$_f$ (RT)(M$_w$ΔH$_{vap}$)$^{-1}$, where R$_f$ is the intrinsic mass transfer resistance of the sample, R is the universal gas constant, T is temperature, M$_w$ is molar mass of water, and ΔH$_{vap}$ is the enthalpy of vaporization of water.

TABLE 5

ISV terpolymer resistance to evaporative heat transfer.

| Sample | R$_{et}$ [m$^2$-Pa Watt$^{-1}$] |
|---|---|
| tefzel film | 2690 |
| ISV119 "open" | 8.8 |
| ISV119 "closed" | 9.6 |
| Supported ISV119 "open" | 13.2 |
| Supported ISV119 "closed" | 14.2 |
| open cell | 6.2 |

Tensile testing of the materials can be performed on an Instron (model 4442) equipped with a 1 kN load cell with loading strain rates of 1, 10, and 100 mm min$^{-1}$. The samples were 13 mm×20 mm with a thickness of 0.11 mm. Stress-strain curves were constructed, and the Young's Modulus was determined by calculating the slope within the proportionality limit of the curve. The toughness can be calculated by integrating the stress-strain curve over the entire deformation range. Samples can be fixed and repeatedly flexed (three sets of 10 flexes) to a curvature of 3 cm$^{-1}$ at a rate of 0.5 Hz.

The entirety of both "Biocatalytic Stimuli-Responsive Asymmetric Triblock Terpolymer Membranes for Localized Permeability Gating" by Poole et al, Macromolecular Rapid Communications, 2017, 1700364, and Supporting Information for Macromol. Rapid Commun., DOI: 10.1002/marc.201700364 "Biocatalytic Stimuli-Responsive Asymmetric Triblock Terpolymer Membranes for Localized Permeability Gating" by Poole et al, are both incorporated herein by reference.

Enzymes can be incorporated into ISV membranes to test their ability to hydrolyze simulants on the surface of the membrane in low (<20%) and high (>90%) humidity. For example, 8 mm ISV membranes can be coated with phosphotriesterase (PTE), haloalkane dehalogenase(DHG), or both and allowed to dry. In accordance with one example, enzyme can be provided at 51.7 µg/mm$^2$, 25.9 µg/mm$^2$, and 5.2 µg/mm$^2$. The enzyme coated membranes and a breakthrough membrane can be incorporated into the cap of a GC vial containing artificial sweat. This vial can then be placed into a 20 mL vial containing another GC vial with either water (>90% humidity) or saturated lithium chloride (<20% humidity). The larger vial may be capped, and the internal environment allowed to equilibrate for 15 minutes. 500 µg of Diethyl VX per mm$^2$ can then be added the membrane and allowed to incubate overnight. The membranes may then be extracted for GC-MS analysis.

Figure 16:
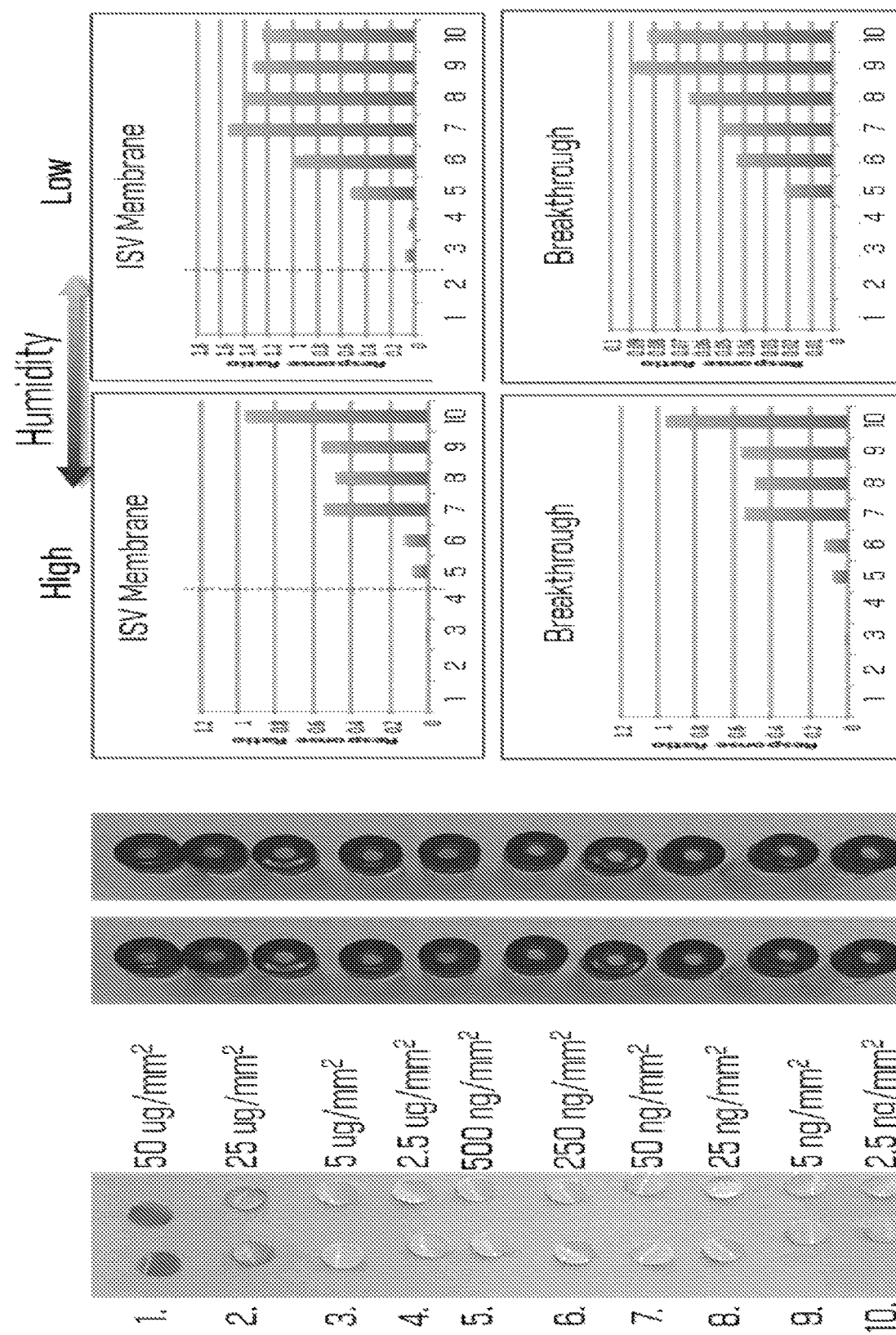

In accordance with another example, ten different levels of enzyme were loaded within the membranes ranging from 50-2.5 µg/mm$^2$ (See Table 6 Below) These membranes were then tested for surface decontamination of the simulant diethyl VX at a load of 500 ug/cm$^2$ under high (>90%) or low (<20%) humidity conditions. After a 24 incubation the membrane and breakthrough material were both extracted per the above protocol to quantitate decontamination and agent breakthrough within the sample. The graphs of FIG. 16 show with the green dotted line the loading of enzyme required to achieve full decontamination of the simulant under each condition.

TABLE 6

Enzyme Membrane Load at >90% and <20% humidity.

| |
|---|
| 50 ug/mm$^2$ |
| 25 ug/mm$^2$ |
| 5 ug/mm$^2$ |
| 2.5 ug/mm$^2$ |
| 500 ng/mm$^2$ |
| 250 ng/mm$^2$ |
| 50 ng/mm$^2$ |
| 25 ng/mm$^2$ |
| 5 ng/mm$^2$ |
| 2.5 ng/mm$^2$ |

Figure 17:
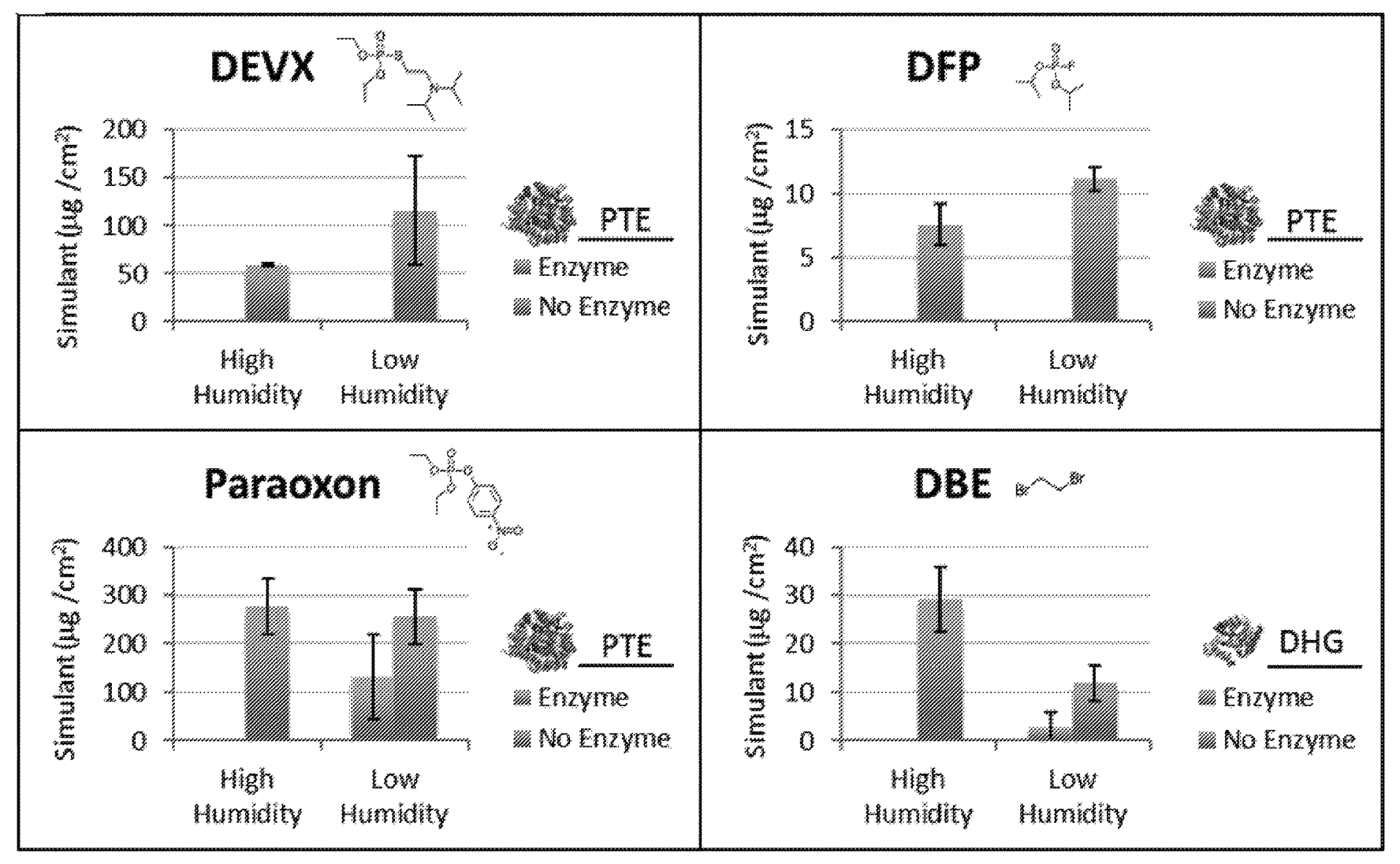

Using the same format as described above, the study can be expanded to include contamination of simulants diisopropylfluorophosphate (DFP), ethyl paraoxon, and dibromoethane (DBE), in addition to DEVX. Each simulant can be tested under both high and low humidity environment. Under the loading conditions of 51 µg/mm$^2$ for PTE and 20 µg/mm$^2$ for Haloalkane Dehalogenase (DHG), membranes were separately challenged with 500 µg/cm$^2$ of Diisopropyl fluorophosphate (DFP), Paraoxon or Dibromoethane (DBE) under dry (<20% humidity) and humid (>90% humidity) conditions. GC-MS analysis demonstrated that full hydrolysis of each simulant occurs under humid conditions. The data presented in FIG. 17 shows that even though 500 µg/cm$^2$ of DBE and DFP were added, some of it volatilized due to the vapor pressure of the simulants. The rest was removed by enzymatic hydrolysis. Those with lower vapor pressures, paraoxon and DEVX remained on the control membrane or were hydrolyzed by the enzyme.

Figure 18:
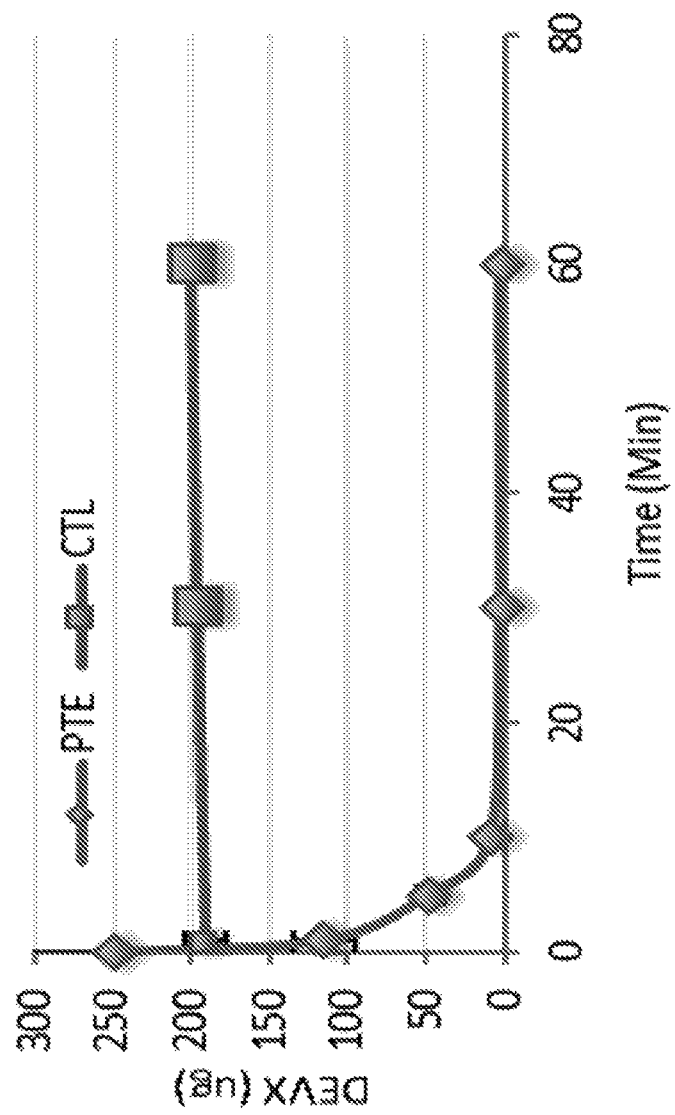

Under humid conditions, 500 µg/cm$^2$ DEVX can be added to phosphotriesterase loaded membranes. Samples were analyzed by GC-MS analysis at 0, 1, 5, 10, 30 and 60 minutes. With 51 µg/cm$^2$ enzyme loaded onto an ISV membrane, a hydrolysis of >99% of a 500 µg/cm$^2$ challenge can be observed within the first 30 minutes of the challenge with decontamination rates for this time ranging from 135 to 0.3 µg/cm$^2$*min, as shown in FIG. 18.

To determine the ability of the enzyme-loaded membranes to respond to sequential DEVX challenges, phosphotriesterase enzyme was loaded onto ISV membranes at 51 µg/mm$^2$. Additive challenges of 500 µg/cm$^2$ (250 µg per 8 mm membrane) can be performed at 0, 1 and 2 hours (1.5 mg/cm$^2$ cumulative challenge). Membranes may be analyzed for the presence of remaining DEVX at 1, 2 and 3 hours.

Figure 19:
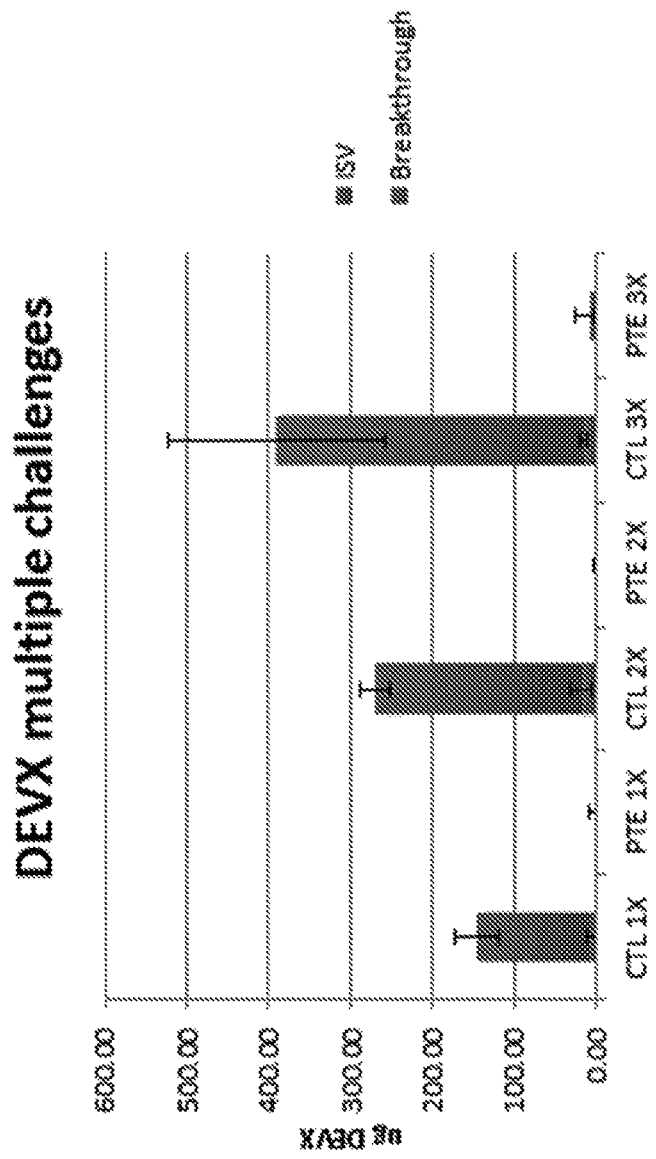

The results demonstrate that DEVX hydrolysis continues after the initial challenge and even after the third challenge of 500 µg/cm$^2$, >90% of the DEVX is hydrolyzed with no breakthrough observed as shown in FIG. 19.

Figure 20:
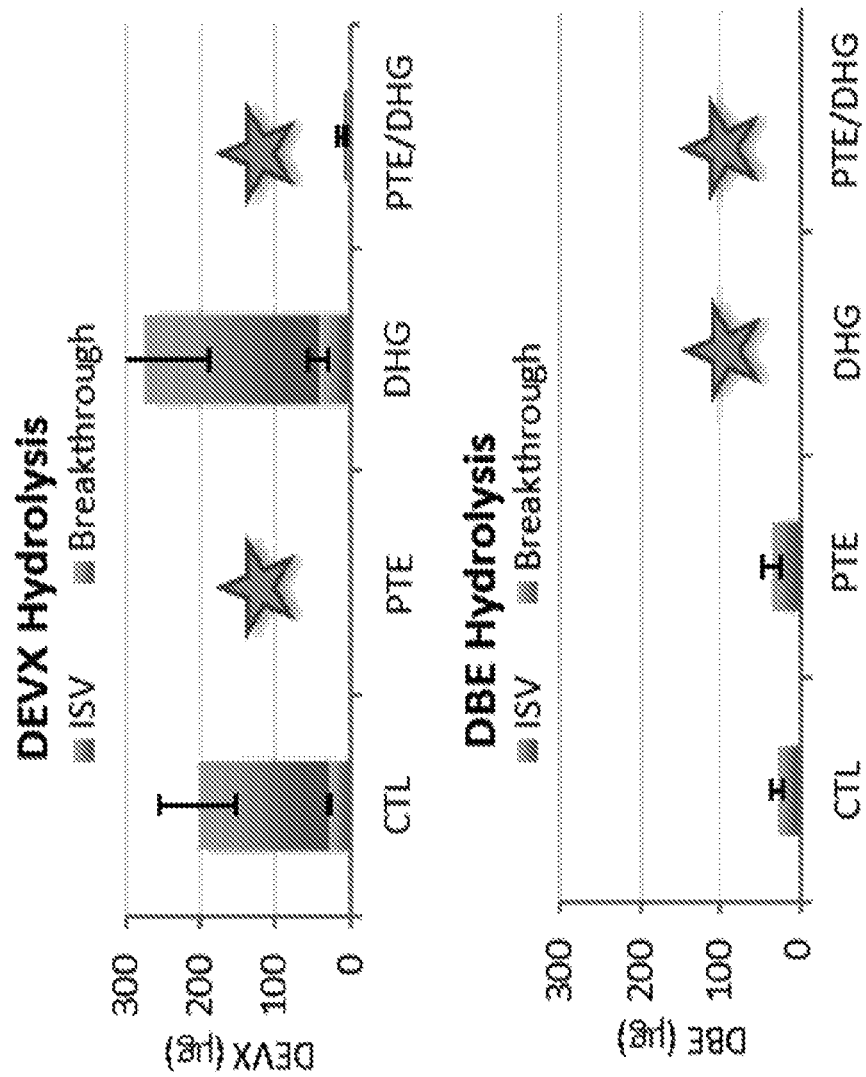

Moving toward assessing the ability of the material to address multiple types of challenges in a single form factor, the best method of performing challenges with a mix of agents may be determined. 500 μg/cm$^2$ of DEVX and DBE, as well as serial dilutions of each, can be either mixed or added separately to a chloroform extraction with internal standard and analyzed by GC-MS and the resulting data shown in FIG. 20.

Figure 21:
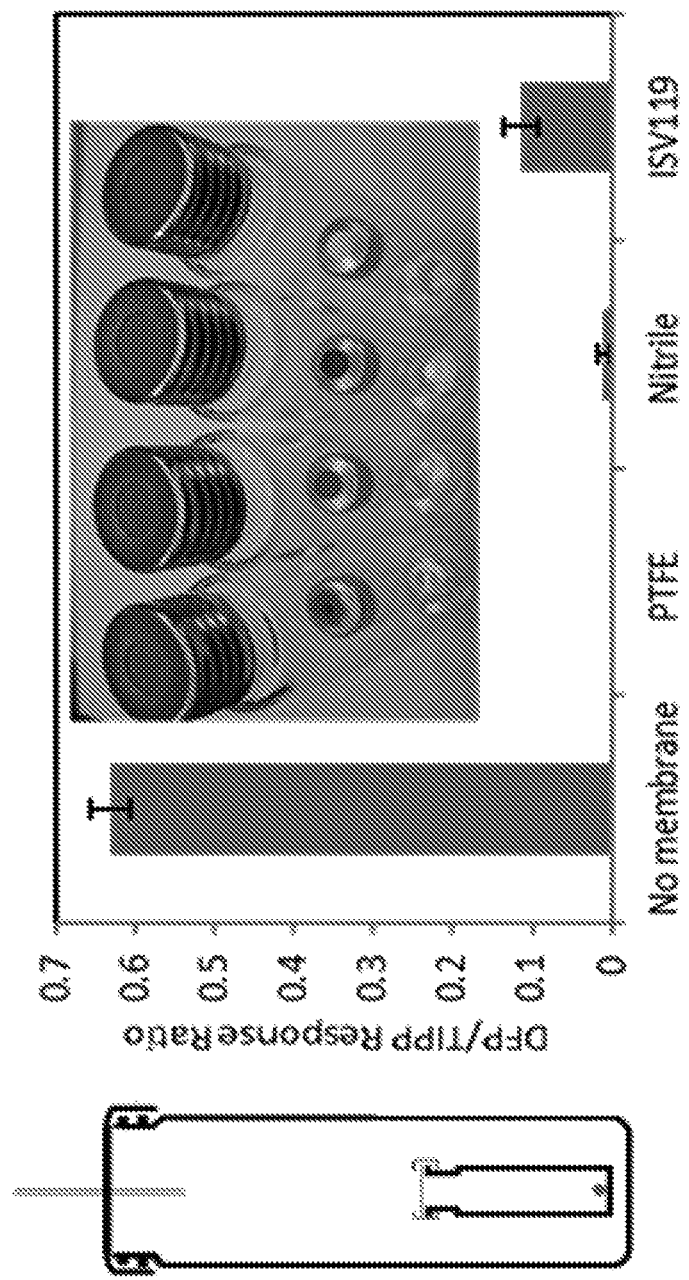
Figure 22:
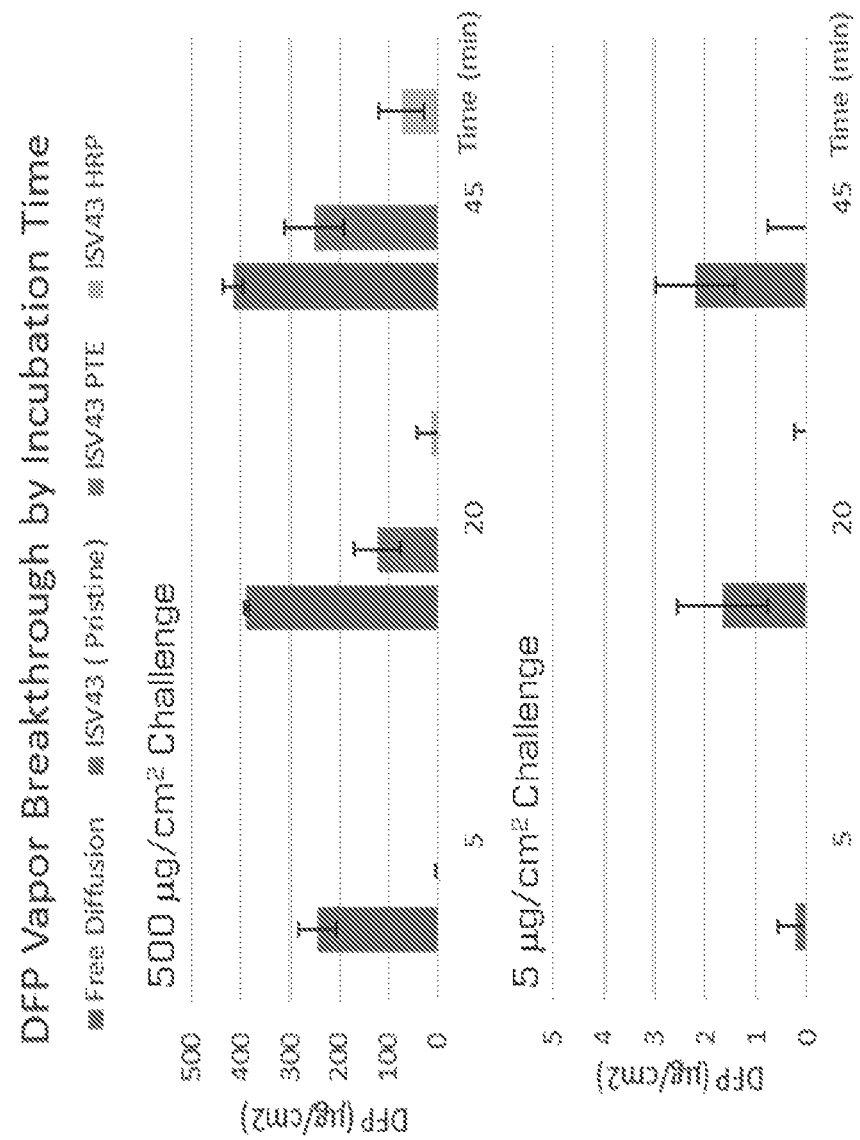

Methods used to quantitate agent permeation can include the following:

Samples analyzed by this method are shown in FIG. 21 for comparison of vapor permeation, no membrane (i.e. open system), PTFE, Nitrile, and the ISV membrane.

The headspace gas chromatography method outlined by the ECBC may be used to analyze DFP simulant permeation through ISV membrane and several control samples. Enzymatic loading can be performed via drop-casting. Horseradish Peroxidase (HRP) {E.C. 1.11.17} was utilized as a control for Phosphotriesterase (PTE). HRP has a molecular weight of 44 g/mol as compared with PTE, which has a molecular weight of 35.90 g/mol. Analyzing the protein electrostatics, the overall protein charges are also similar with PTE having an overall charge of −2.6 while HRP contains an overall charge of −2 under neutral conditions.

Upon receiving the membranes, they may be treated for the vial-in-vial protocol. This entailed as mentioned previously rinsing the membranes with water, drying the membranes to remove any residual moisture, drop-casting enzyme onto the membrane and then drying the enzyme loaded membranes. Once dried the membranes can then conditioned for 24-48 hours in a humid environment at 37° C. Enzyme loading within the material may be performed at a protein loading concentration of 7 μg/mm$^2$. This concentration dried upon the membrane produces a uniform enzyme coating which does not appear to flake or clump. The membranes may than be tested in the previously described vial-in-vial experimentation setup with 500 μg/cm$^2$ Diisopropyl flurophosophate (DFP) to monitor vapor permeation across the enzyme loaded ISV membrane. Triisopropyl Phosphate (TIPP) was utilized as the internal standard reference. The temperature of analysis was 37° C.

After 45 minutes, the Free Diffusion samples recovered 83% of the 500 μg/cm$^2$ initial DFP loaded in the challenge vial. The mere addition of the pristine ISV$_{43}$ reduces the vapor permeation by 39.5% for the same time-course. Examining the enzyme loaded samples after 45 minutes, the HRP alone provided an 82% reduction in free diffusion. This is most likely due to steric hinderance and pore blockage since HRP shows little catalytic activity toward DFP as previously documented. The PTE loaded membranes for the same duration record values under the established calibration range. These effects are amplified as seen with the lower simulant challenge of 5 μg/cm$^2$ DFP. In analyzing the vapor permeation after 45 minutes, free diffusion recovers approximately 64% of initial DFP challenge. See for example, FIG. 22.

Figure 23:
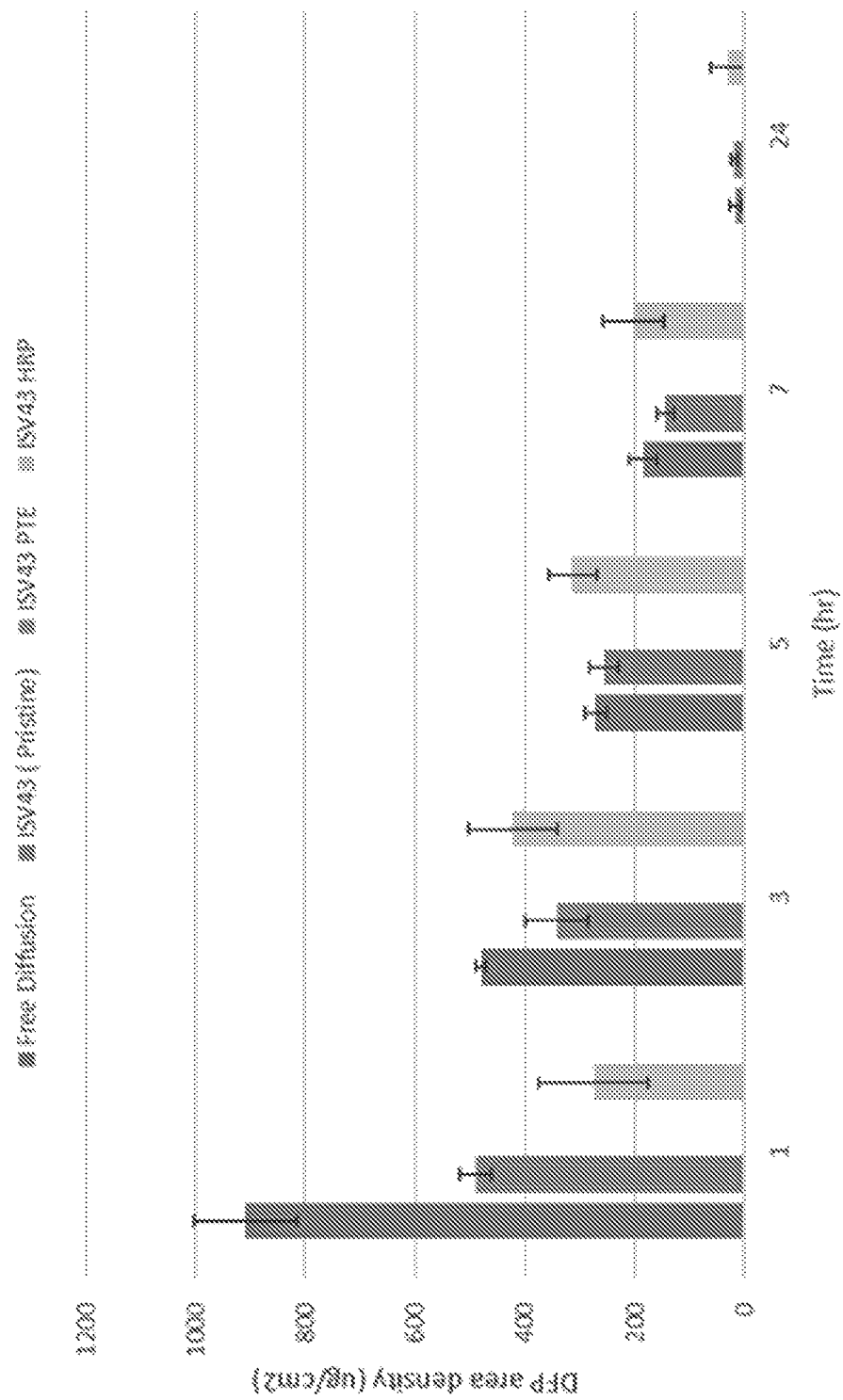
Figure 24:
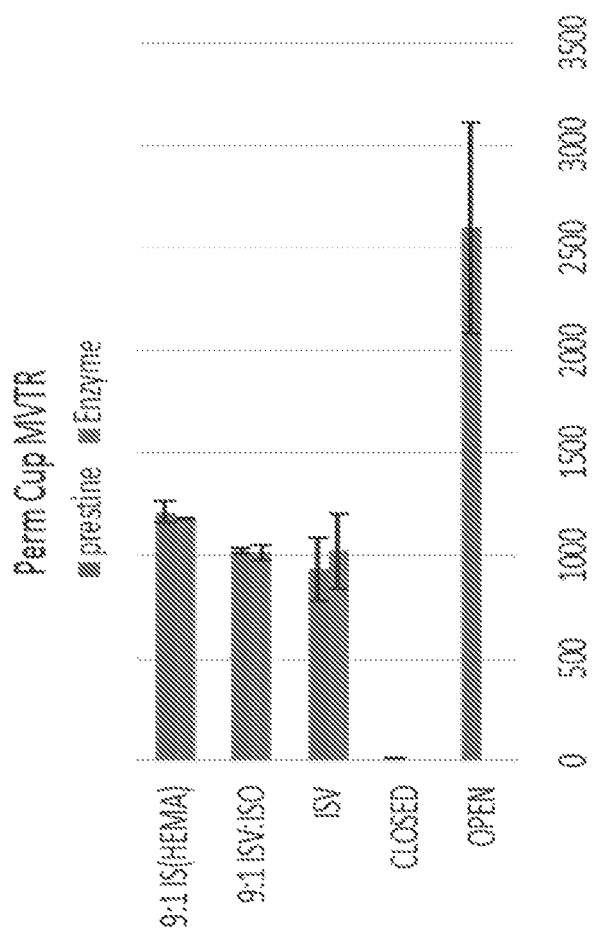

An extended time course examination was conducted monitoring vapor permeation from 1 hour after initial simulant loading up to 24 hours. For this experiment, twice the amount of the standard 500 μg/cm$^2$ challenge was utilized 1000 μg/cm$^2$ and the data is shown in FIG. 23. Examining free diffusion, the maximum concentration of vapor in the headspace was achieved at the 1 hour mark, decreasing at each subsequent time point. Even with these extend dwell times, there was no significant increase in DFP permeation for the PTE loaded ISV membranes.

To determine the effect of enzyme loading on the MVTR of SNIPS membranes, pure and blended ISV membranes were loaded with protein solution and the change in MVTR was measured. This is an important factor as MVTR is directly related to the material's thermal burden performance specifications. Replicate membranes of pure ISV (YML644A and YML644B), blended ISV:ISO (9:1A ISV:ISO and 9:1B ISV:ISO), and blended ISV:IS(HEMA) (9:1A IS(HEMA) and 9:1B IS(HEMA)) were tested and the data shown in FIG. 24.

Asymmetric membranes were fabricated by employing a hybrid process combining block copolymer self-assembly with a non-solvent induced phase separation process (SNIPS). Pure ISV membranes were cast from a 11% (by weight) ISV$_{138}$ polymer solution in a solvent mixture of 1,4-dioxane (DOX) and tetrahydrofuran (THF) (7:3 by weight). For the ISV:ISO blend, a ternary solvent mixture of DOX, THF, and acetonitrile (MeCN) was used as the solvent system. The casting solutions were prepared by separately dissolving 11% and 18% of ISV and ISO, respectively, in a solvent system consisting of DOX/THF/MeCN (~67/28/5 wt %) at 300 rpm overnight. The ISV:ISO weight ratios of 9:1 was maintained in the individual casting solutions prior to blending. The individual casting solutions containing the desirable blend weight ratios were then mixed and stirred together at 300 rpm for 10 minutes to form a hybrid casting solution. The dope solution was cast by doctor blade with a gate height of 220 μm onto a 0.1 micron nylon substrate using an automated set-up. After 100 seconds for pure ISV and 120 seconds for blended ISV:ISO membranes, the thin film was immersed into a coagulation bath of deionized water. Samples of ISV:IS(HEMA) membranes in a 9:1 weight ratio were prepared and supplied by Terapore.

An evaporative dish method, based on the British Standard BS 720921, was used to determine the MVTR in membrane samples. The Turl dish assembly consists of a dish, triangular support, and cover ring. The test specimen is comprised of two circular membrane samples, with a total area of 402 mm$_2$, anchored to a circular transparency film, purchased from C-Line Products, Inc. (No. 60837), using epoxy. The test specimen was sealed over the mouth of the dish containing deionized water and the triangular support to maintain a ~10 mm air gap. The cover ring was placed above the test specimen and adhesive tape was applied around the circumference of the completed assembly. The assemblies were positioned into a turntable and the experiment was conducted in a controlled atmosphere at 20° C. and 65% relative humidity. The assemblies were weighed on a balance with a resolution of 0.01 g. Each assembly was weighed daily up to six days in order to assure full equilibration. After six days, the pristine membranes were loaded with 60 microliters of protein solution (bovine serum albumin; BSA in 0.1 M PBS) with a concentration of 130 g/L. Each assembly was weighed daily. The reported MVTR values were averaged over five days. The MVTR (g/m$_2$/day) was calculated as: MVTR=24M/At, where M is the loss in mass of water in grams, t is the time period in hours, and A is the area of the membrane sample in m$_2$.

The MVTR values of the SNIPS membranes are not significantly affected by the loading of protein at such a high concentration. This result is encouraging as this indicates that enzyme may be loaded within the membrane at high concentrations without significantly impeding the moisture vapor flow through the membrane in the open state. It is important to note that the variability in the MVTR of the open reference can be due to the slight variability in ambient temperature and humidity of the room in the summer months.

The invention claimed is:

1. A material system comprising:

a support layer; and a permeable porous material positioned on the support layer and configured to modulate repeatably between an open state and a closed state upon exposure to a reactant, wherein permeability of the permeable porous material in the closed state is less than permeability of the permeable porous material in the open state; and a reagent immobilized on the permeable porous material, wherein the reagent is configured to convert the reactant into a chemical trigger to locally reduce permeability of vapor and/or liquids through the permeable porous material;

wherein the material system is integrated into at least one of clothing, a suit, a mask, and a protective textile application.

2. The material system of claim 1 wherein the permeable porous material is nano to macroporous.

3. The material system of claim 1 wherein the reagent is stoichiometric or catalytic.

4. The material system of claim 1 wherein the reagent comprises one or more of enzymes, metal organic frameworks, metal oxides, and oximes.

5. The material system of claim 1 wherein the reagent is non-covalently bonded to the permeable porous material.

6. The material system of claim 1, wherein the reactant is a chemical warfare agent.

7. The material system of claim 1, wherein the reagent is an enzyme.

8. The material system of claim 1, wherein locally reducing permeability of vapor and/or liquids through the permeable porous material prevents the reactant from passing through the permeable porous material.

9. The material system of claim 1, wherein the support layer is nylon-based.

10. The material system of claim 1, wherein the permeable porous material comprises poly(4-vinylpyridine).

11. The material system of claim 10, wherein the reactant is a chemical warfare agent and the reagent is an enzyme.

12. The material system of claim 1, wherein the material system comprises a moisture vapor transmission rate of at least 500 $g/m^2/day$.

13. The material system of claim 12, wherein the material system comprises an elastic modulus greater than 300 MPa.

* * * * *